United States Patent [19]
Takeuchi et al.

[11] Patent Number: 5,615,843
[45] Date of Patent: Apr. 1, 1997

[54] SPINNING REEL FOR FISHING HAVING FISH-LINE ENTRY RESTRAINER

[75] Inventors: Shinji Takeuchi; Eiji Shinohara; Masayuki Kawashiro, all of Tokyo, Japan

[73] Assignee: Daiwa Seiko, Inc., Tokyo, Japan

[21] Appl. No.: 359,616

[22] Filed: Dec. 20, 1994

[30] Foreign Application Priority Data

| Dec. 28, 1993 | [JP] | Japan | 5-338620 |
| Apr. 21, 1994 | [JP] | Japan | 6-083354 |
| Apr. 25, 1994 | [JP] | Japan | 6-086708 |

[51] Int. Cl.⁶ ............................................. A01K 89/01
[52] U.S. Cl. ........................................ 242/319; 242/322
[58] Field of Search ..................................... 242/319, 322

[56] References Cited

U.S. PATENT DOCUMENTS

| 4,106,718 | 8/1978 | Catignani . |
| 4,561,604 | 12/1985 | Matsushima ............... 242/319 |
| 4,778,124 | 10/1988 | Shinohara . |
| 4,834,311 | 5/1989 | Kaneko . |
| 5,318,247 | 6/1994 | Sugawara . |
| 5,356,091 | 10/1994 | Sugawara . |

FOREIGN PATENT DOCUMENTS

| 988893 | 9/1951 | France . |
| 3-9656 | 3/1991 | Japan . |

Primary Examiner—Katherine Matecki
Attorney, Agent, or Firm—Longacre & White

[57] ABSTRACT

A spinning reel for fishing includes a rotor rotatably fitted to a reel body, and a spool supported by the reel body via a spool shaft in such a manner that the spool is capable of a traverse motion in the axial direction of the spool shaft and that a fishing line is wound thereon when the rotor is rotated by a manually operated handle. The spinning reel for fishing is further includes a fishing-line entry restrainer for preventing the fishing line from being wound on the spool shaft. The fishing-line entry restrainer is movably fitted to the cylindrical portion of the rotor placed in the spool. A follow-up mechanism is provided for causing the fishing-line entry restrainer to move forward when the spool is moved in the same direction.

22 Claims, 20 Drawing Sheets

SPINNING REEL FOR FISHING HAVING FISH-LINE ENTRY RESTRAINER

BACKGROUND OF THE INVENTION

The present invention relates to a spinning reel for fishing which is capable of preventing a fishing line from being caught in a clearance between a rotor and a spool.

A typical spinning reel for fishing is arranged, as shown in FIG. 25, such that a semi-annular bail 5 can be reversibly set at either one of a fishing-line winding position (A side in FIG. 25) and a fishing-line releasing position (B side in FIG. 25), the bail being mounted, via bail support members, e.g, a bail arm 9 with a line roller 7 and a bail holder (not shown), onto forward ends of a pair of bail support arms 3 provided on both sides of a rotor 1, respectively.

The bail 5 is first brought down to the fishing-line winding position as shown in FIG. 25, and then the rotor 1 is rotated in the winding direction by turning a manually operated handle 13 provided on a reel body 11, whereby a fishing line is wound onto a spool 15 making the longitudinal reciprocating motion linking with the rotation of the rotor 1. In FIG. 25, reference numeral 17 denotes a mounting leg integrally formed with the reel body 11.

In the spinning reel for fishing of the sort mentioned above, the so-called "undesirable line catch" may occur that the fishing line enters a clearance between the spool 15 and the rotor 1 due to tensional fluctuation, twisting of the fishing line and the like when the fishing line is wound up, and the fishing line is wound onto and caught by a spool shaft (not shown) of the spool 15.

To reduce the above-noted problem, there has been developed a spinning reel for fishing which is provided with a fishing-line entry restrainer as disclosed in Japanese Utility Model Kokoku Publication No. Hei. 3-9656. FIGS. 26 and 27 show such a spinning reel, in which a fishing-line entry restrainer 25 is fitted on a spool shaft 27 in a spool 23 so that the fishing-line entry restrainer 25 longitudinally moves together with the spool 23 along bail support arms 21 while rotating together with a rotor 19. In FIGS. 26 and 27, reference numeral 29 denotes restraining portions of the fishing-line entry restrainer 25, the restraining portions being provided with, at its forward end, mating portions 31 which mate with the respective bail support arms 21.

When the rotor 19 in such a spinning reel for fishing is rotated by turning the manually operated handle so as to wind the fishing line on the spool 23, the rotational torque of the rotor 19 is transmitted from the bail support arms 21 via the mating portions 31 to the fishing-line entry restrainer 25, which rotates together with the rotor 19, and the moving force of the spool shaft 27 in the longitudinal direction is also transmitted to the fishing-line entry restrainer 25, so that the fishing-line entry restrainer 25 in combination with the spool 23 moves along the bail support arms 21.

Therefore, even when the fishing line tries to enter the clearance between the spool 23 and the rotor 19 due to tensional fluctuation and the twisting of the fishing line, the restraining portions of the fishing-line entry restrainer 25 prevent the entry of the fishing line.

This type of the spinning reel still has the following disadvantage: It is known that when the fishing line is wound up upon hitting of the fish, the bail support arms are deformed inwardly if a great load is applied to the fishing line. Thus, in the arrangement in which the fishing-line entry restrainer 25 in combination with the spool 23 is moved back and forth along the bail support arms 21, the deformation of the bail support arms 21 hinders the fishing-line entry restrainer 25 from smoothly moving. In case where, for example, the reel is accidentally dropped with the result that the bail support arms 21 are plastically deformed or where sea water, sand, dust or the like happens to stick to the bail support arms 21, the fishing-line entry restrainer 25 will not move smoothly. Consequently, the longitudinal movement of the spool 23 incorporating the fishing-line entry restrainer 25 and the rotation of the rotor 19 will be impaired, and the fishing line cannot be wound up or drawn out smoothly.

SUMMARY OF THE INVENTION

The present invention was made in view of the foregoing problems. An object of the present invention is to provide a spinning reel for fishing which is capable of preventing the undesirable line catch without causing any trouble to the operation of winding or releasing the fishing line.

In order to accomplish the above-noted and other objects, the present invention provides a spinning reel for fishing, which comprises a rotor rotatably provided on a reel body, and a spool supported by the reel body via a spool shaft in such a manner that the spool is capable of making a reciprocating motion in the axial direction of the spool shaft and that a fishing line is wound thereon when the rotor is rotated by a manually operated handle, and is characterized in that a fishing-line entry restrainer for preventing the fishing line from being wound on the spool shaft is movably fitted to the cylindrical portion of the rotor placed in the spool, and there is provided follow-up means for causing the fishing-line entry restrainer to move forward when the spool is moved forward.

In the spinning reel for fishing, the spool is caused to make the reciprocating motion by winding or releasing the fishing line, and when the spool is moved forward the follow-up means makes the fishing-line entry restrainer move in the same direction. Then the fishing-line entry restrainer thus moved extends across the clearance or gap between the cylindrical portion of the rotor and the spool or the spool shaft to prevent the fishing line from being caught by the spool shaft.

In the spinning reel for fishing, the follow-up means may be a retaining portion provided on one of the spool and the spool shaft and engageable with the fishing-line entry restrainer to move the fishing-line entry restrainer in linking with the one of the spool and the spool shaft. In the spinning reel for fishing of this case, the retaining portion can engage with the fishing-line entry restrainer to cause the fishing-line entry restrainer to move forward when the spool is moved forward.

In the spinning reel for fishing, the follow-up means may be a spring member held between the rotor and the fishing-line entry restrainer for urging the fishing-line entry restrainer forward. In the spinning reel for fishing of this case, the spring member moves the fishing-line entry restrainer in the same direction when the spool moves forward.

The present invention further provides a spinning reel for fishing, which comprises a rotor rotatably provided on a reel body, and a spool supported by the reel body via a spool shaft in such a manner that the spool is capable of making a reciprocating motion in the axial direction of the spool shaft and that a fishing line is wound thereon when the rotor is rotated by a manually operated handle, and is characterized in that a fishing-line entry restrainer is provided on a cylindrical portion of the rotor, which cylindrical portion is placed within the spool. The fishing-line entry restrainer is made up of a restrainer base fixed stationary to the cylindrical portion of the rotor and a movable restrainer member provided on the restrainer base and longitudinally movable. The spinning reel further includes follow-up means for causing the fishing-line entry restrainer to move forward when the spool is moved forward.

In the spinning reel for fishing, the spool is caused to make the reciprocating motion by winding or releasing the fishing line, and when the spool is moved forward the follow up means makes the movable restrainer member of the fishing-line entry restrainer move in the same direction. As the movable restrainer member is thus moved, the fishing-line entry restrainer extends across the gap between the cylindrical portion of the rotor and the spool or the spool shaft to prevent the fishing line from being caught by the spool shaft.

In the spinning reel for fishing, the follow-up means may be a retaining portion provided on one of the spool and the spool shaft, and engageable with the movable restrainer member so as to move the same in linking with the spool. In the spinning reel for fishing of this case, the retaining portion can engage with the movable restrainer member to cause the movable restrainer member to move forward when the spool is moved forward.

In the spinning reel for fishing of this case, the follow-up means may be a spring member held between the rotor and the movable restrainer member for urging the movable restrainer member forward. In the spinning reel for fishing of this case, the spring member moves the movable restrainer member in the same direction.

The present invention further provides a spinning reel for fishing, which comprises a rotor rotatably provided on a reel body, and a spool supported by the reel body via a spool shaft in such a manner that the spool is capable of making a reciprocating motion in the axial direction of the spool shaft and that a fishing line is wound thereon when the rotor is rotated by a manually operated handle, and is characterized in that a fishing-line entry restrainer for preventing the fishing line from being wound on the spool shaft is movably fitted on one of the inner face of the spool and the spool shaft, and follow-up means is provided for causing the fishing-line entry restrainer to move forward when the spool is moved forward.

In the spinning reel for fishing, the fishing line is wound on the spool making the longitudinal traverse motion linking with the rotation of the rotor during the operation of releasing or winding the fishing line, and when the spool is moved forward, the follow-up means makes the fishing-line entry restrainer move in the same direction. Then the fishing-line entry restrainer thus moved extends across the gap between the rotor and the spool shaft to prevent the fishing line from being caught by the spool shaft.

In the spinning reel for fishing, the follow-up means may be a retaining portion provided on one of the spool and the spool shaft, and engageable with the fishing-line entry restrainer to move the fishing-line entry restrainer in linking with the forward motion of the spool. In the spinning reel for fishing of this case, the retaining portion can engage with the fishing-line entry restrainer to cause the fishing-line entry restrainer to move forward when the spool is moved forward.

In the spinning reel for fishing, there may be further provided a spring member held between the spool and the fishing-line entry restrainer for urging the fishing-line entry restrainer backward along the spool shaft. In the spinning reel for fishing of this case, the spring member urges the fishing-line entry restrainer backward to prevent the fishing-line entry restrainer from clattering during when the fishing-line entry restrainer is moved.

BRIEF DESCRIPTION OF THE ACCOMPANYING DRAWINGS

DETAILED DESCRIPTION OF THE PREFERRED EMBODIMENTS

Referring to the accompanying drawings, a detailed description will subsequently be given of embodiments of the present invention.

Figure 1:
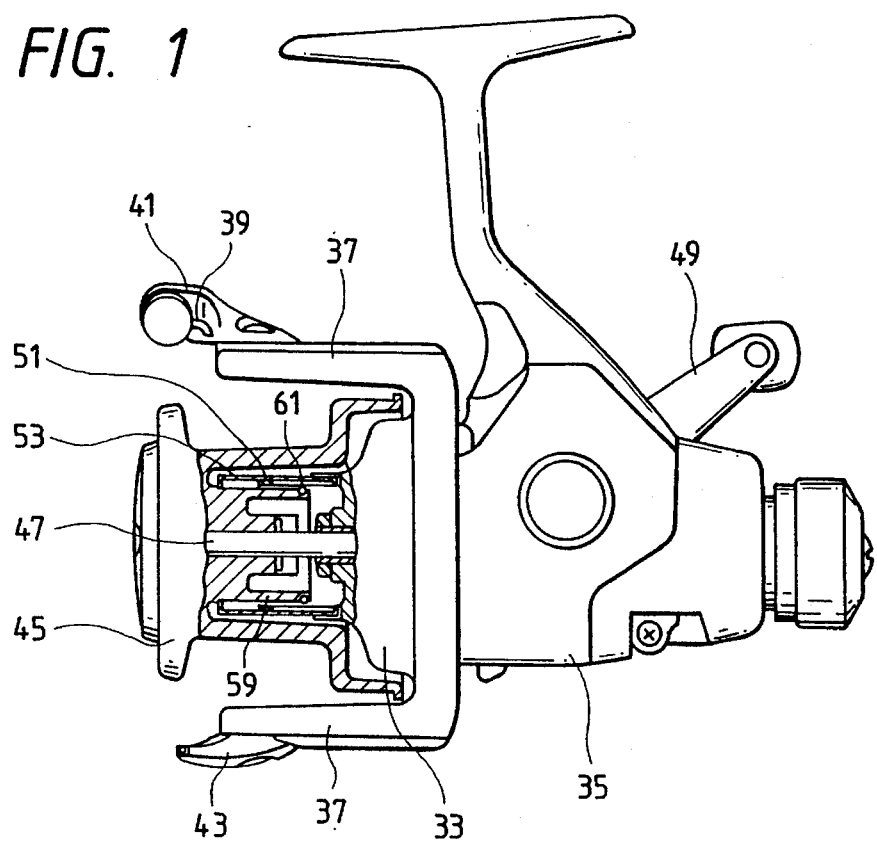
FIG. 1 is a partially cutaway view of a first embodiment of a spinning reel for fishing according to the present invention.

FIGS. 1 through 4 show a first embodiment of a spinning reel for fishing according to the present invention. In FIG. 1, reference numeral 33 denotes a rotor rotatably provided on the leading end of a reel body 35. A pair of bail support arms 37 are integrally molded into the rotor 33 on both the respective rear sides thereof and a semi-annular bail 39 is provided to the leading end of the bail support arm 37 via a bail arm 41 furnished with a line roller 40 and a bail holder 43, the semi-annular bail 39 being set reversible from a fishing-line winding position to a fishing-line releasing position and vice versa.

in FIG. 1, further, reference numeral 45 denotes a spool arranged concentrically with respect to the rotor 33 and supported with a spool shaft 47 which is supported onto the reel body 35 in such a way that it is capable of making a reciprocating motion in an axial direction thereof. When the bail 39 is brought down to the fishing-line winding position and the rotor 33 is rotated by turning a manually operated handle 49 mounted on the reel body 35 as in the well-known manner, the fishing line is wound onto the spool 45 making the reciprocating motion linking with the rotation of the rotor 33.

This embodiment is characterized in that a fishing-line entry restrainer (hereinafter called the "restrainer") 53 for restraining the fishing line from being caught by the spool shaft 47 is installed in between the spool 45 and the cylindrical portion 51 of the rotor 33, which cylindrical portion is generally located within the spool 45.

Figure 2:
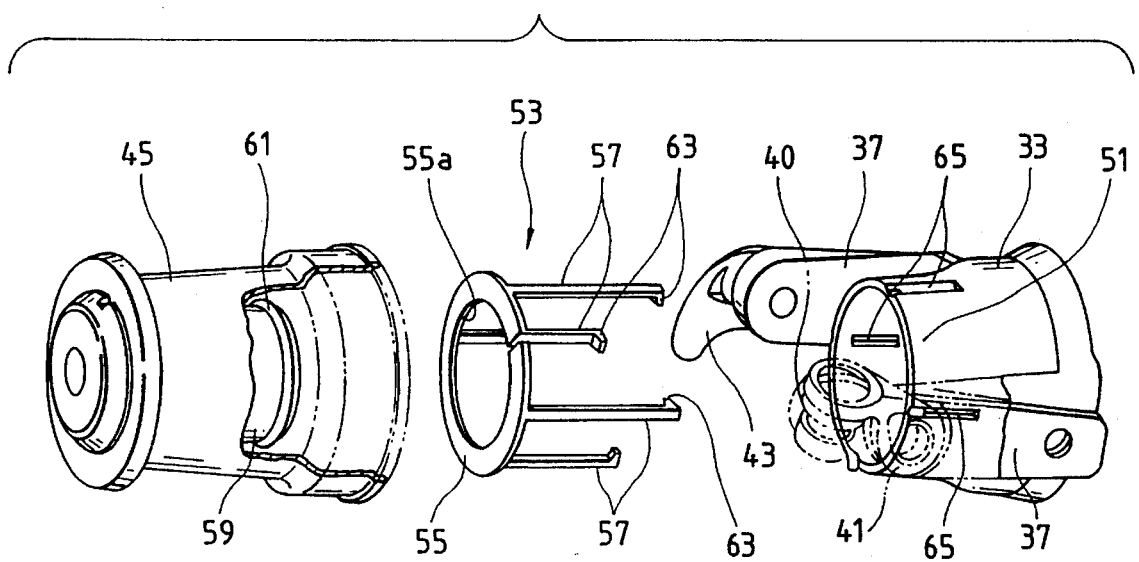
FIG. 2 is an exploded perspective view of the principal part of the spinning reel for fishing shown in FIG. 1.
Figure 3:
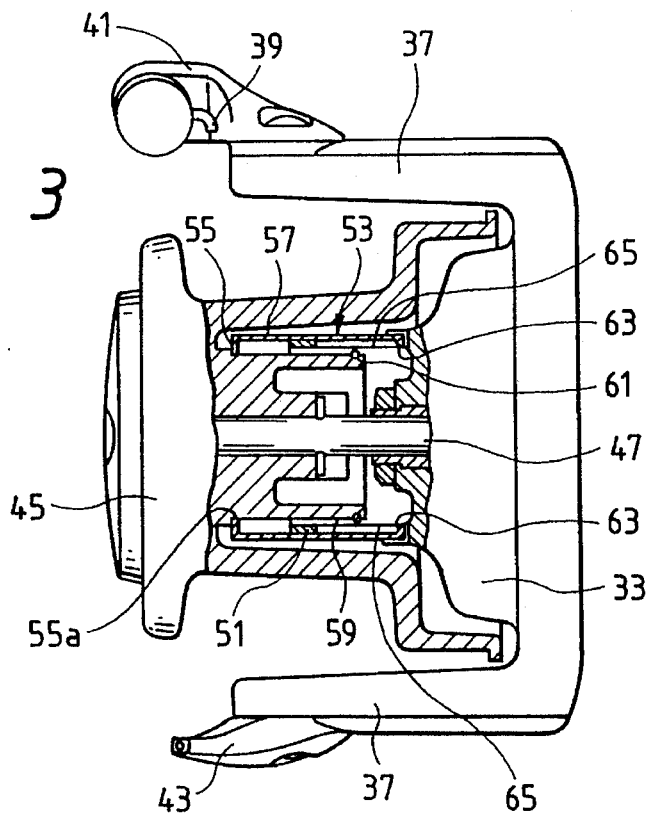
FIG. 3 is a cutaway elevational view of the principal part of the spinning reel for fishing shown in FIG. 1.

As shown in FIGS. 2 and 3, the restrainer 53 is provided with a C-shaped resin-molded annular member 55, and four stays 57 integral with and extended rearwardly from the outer peripheral edge of the annular member 55. The stays 57 in each adjacent pair are arranged at an angular interval of 90°. The annular member 55 is movably fitted on the outer periphery of a cylindrical portion 59 which is located inside the spool 45 and concentric to the spool shaft 47. An O-ring is provided on the outer periphery of the rotor-side end of the cylindrical portion 59 to form a retaining portion 61 circumscribing the rotor-side end. When the spool 45 is moved forward by turning the manually operated handle 49, the retaining portion 61 is brought into engagement with the inner peripheral edge 55a of the annular member 55 as shown in FIG. 4, and thus it functions as a follow-up means for making the restrainer 53 follow the spool moving forward.

On the other hand, the cylindrical portion 51 of the rotor 33 is provided with guide slots 65 which extends in the axial direction of the spool shaft 47. Each of the leading ends of the stays 57 is inwardly bent into L-shape to form an engagement portion 63 which movably engages with the corresponding guide slot 65. In case where the spool 45 which is moving forward as the manually operated handle 49 is turned causes the restrainer 53 to move in the same direction, the restrainer 53 moves along the guide slots 65 while rotating together with the rotor 33 in this embodiment. When the spool 45 is moved up to the forward endmost side, the stays 57 extend across the gap between the cylindrical portion 51 and the cylindrical portion 59 as shown in FIG. 4 so as to prevent the fishing line from being caught by the spool shaft 47. Then the restrainer 53 is pushed back to the original position as the spool 45 is moved back as shown in FIG. 3.

With the above arrangement in this embodiment, the fishing line is wound onto the spool 45 making the reciprocating motion linking with the rotation of the rotor 33 when the manually operated handle 49 is operated to rotate the rotor 33 after the bail 39 is brought down toward the fishing-line winding position. In this fishline winding operation, the forward motion of the spool 45 causes the retaining portion 61 to engage with the inner peripheral edge 55a of the annular portion 55, to thereby move, in the same direction, the restrainer 53 rotating together with the rotor 33. When the spool 45 is moved backward, the restrainer 53 rotating together with the rotor 33 is pushed back to the original position shown in FIG. 3.

Figure 4:
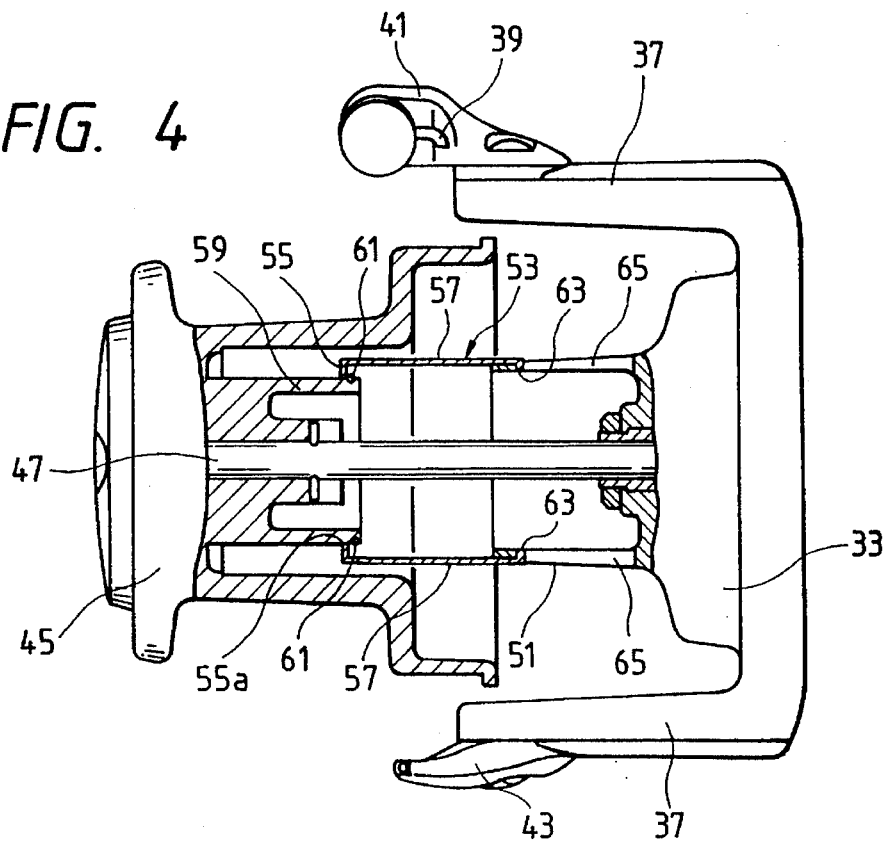
FIG. 4 is a cutaway elevational view of the principal part of the spinning reel for fishing shown in FIG. 1.

In case where the fishing line attempts to enter the gap between the spool 45 and the bail support arm 37 of the rotor 33 due to tensional fluctuation and the twisting of the fishing line, the stays 57 extending across the gap between the cylindrical portion 51 and the cylindrical portion 59 prevent the fishing line from being caught by the spool shaft 47 as shown in FIGS. 3 and 4.

Figure 26:
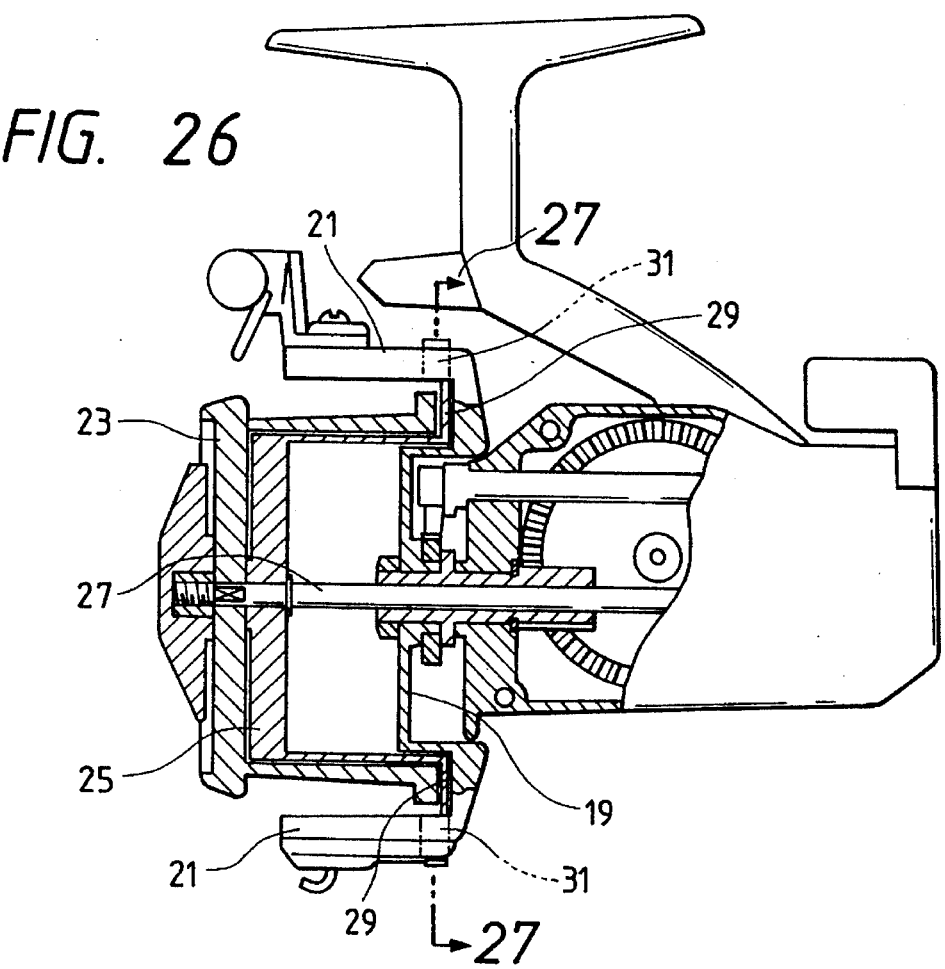
FIG. 26 is a cutaway elevational view of the principal part of another conventional spinning reel for fishing.
Figure 27:
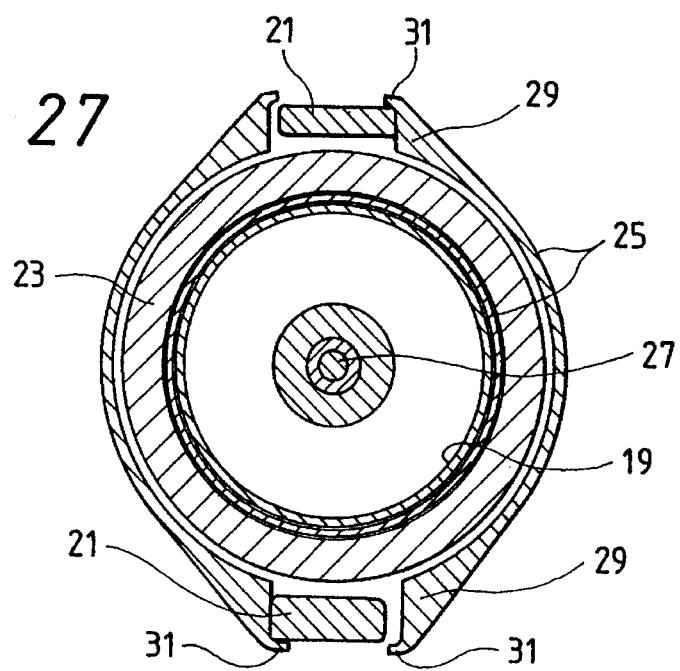
FIG. 27 is a sectional view taken along line 27—27 of FIG. 26.

In the case of the prior art referred to in FIG. 26, the restrainer 25 is moved along the bail support arms 21 which become easily deformed and readily allow sea water, sand and the like to stick thereto and this leads to a disadvantage in that the restrainer 25 becomes hardly movable smoothly when the bail support arm 21 is deformed or when sand is caused to stick thereto. Further, when the restrainer 25 ceases to move smoothly, the movements of the spool 23 and the rotor 19 combined with the restrainer 25 are impaired. In this embodiment, on the contrary, such inconveniences as noted above are avoided to ensure that the fishing line can be set free from the undesirable line catch without causing any trouble to the movements of the spool 45 and the rotor 33.

In this embodiment, moreover, in order to prevent the fishing line from being wound onto the spool shaft 47 it is sufficient that the length of the stays 57 is set so that the stays 57 extend across the gap between the leading end of the cylindrical portion 51 and the rear end of the cylindrical portion 59 when the spool 45 is located at the foremost position. Consequently, it is possible to avoid the increase of the entire weight of the reel even when the stroke of the spinning reel is lengthened.

Figure 5:
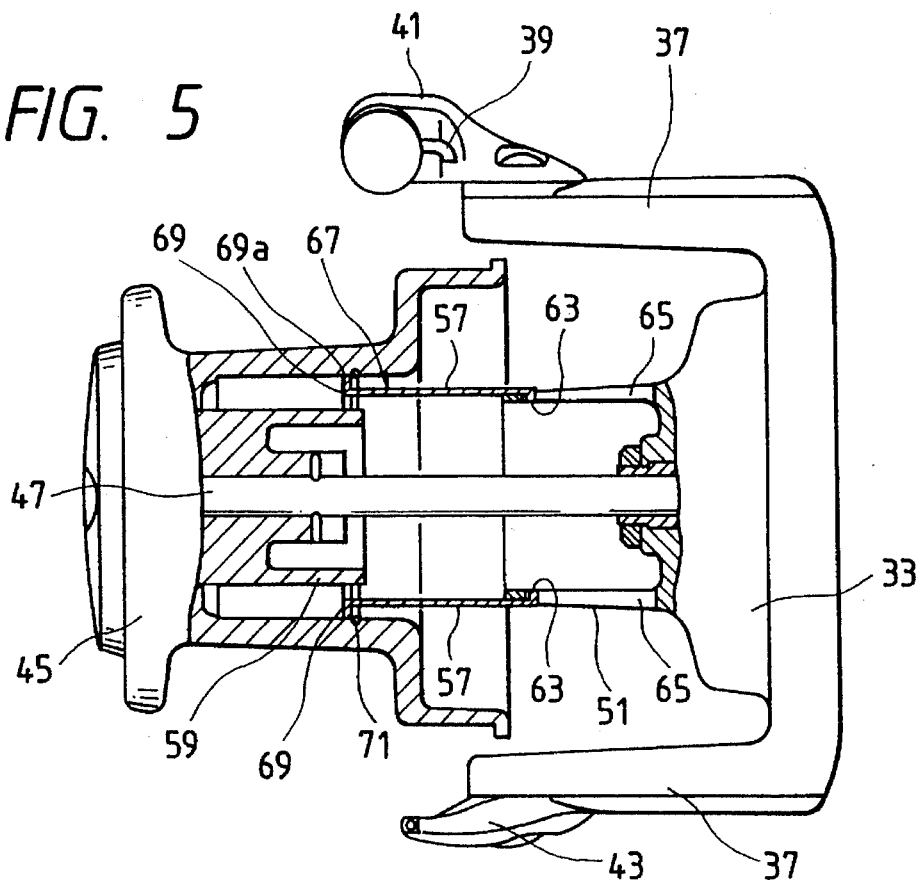
FIG. 5 is a cutaway elevational view of the principal part of a second embodiment of the spinning reel for fishing according to the present invention.

FIG. 5 shows a second embodiment of the spinning reel for fishing according to the present invention. In the first embodiment, when the spool 45 is moved forward, the retaining portion 61 provided on the cylindrical portion 59 of the spool 45 engages with the inner peripheral edge 55a of the annular portion 55 so as to move the restrainer 53 in the same direction. This arrangement may be modified, as in the second embodiment, such that stays 57 are extended rearwardly from the inner peripheral edges of an annular portion 69. That is, in the second embodiment, a restrainer 67 includes a C-shaped resin-molded annular portion 69, and four stays 57 integral with and extended from the inner peripheral edge of the annular member 69. The four stays 57 in the each adjacent pair are arranged at an angular interval of 90°. The annular portion 69 is movably fitted on the inner periphery of the spool 45, and an O-ring is provided on the inner periphery of the spool 45 to form a retaining portion 71 circumscribing the inner periphery of the spool 45. When the spool 45 is moved forward, the retaining portion 71 is brought into engagement with the outer peripheral edge 69a of the annular portion 69 to cause the restrainer 67 to follow the spool 45 in the same direction.

As the remaining component parts are similar to those in the first embodiment, like reference characters designate like parts and the description thereof will be omitted.

Thus the intended purpose can also be accomplished in this embodiment as in the first one.

Figure 6:
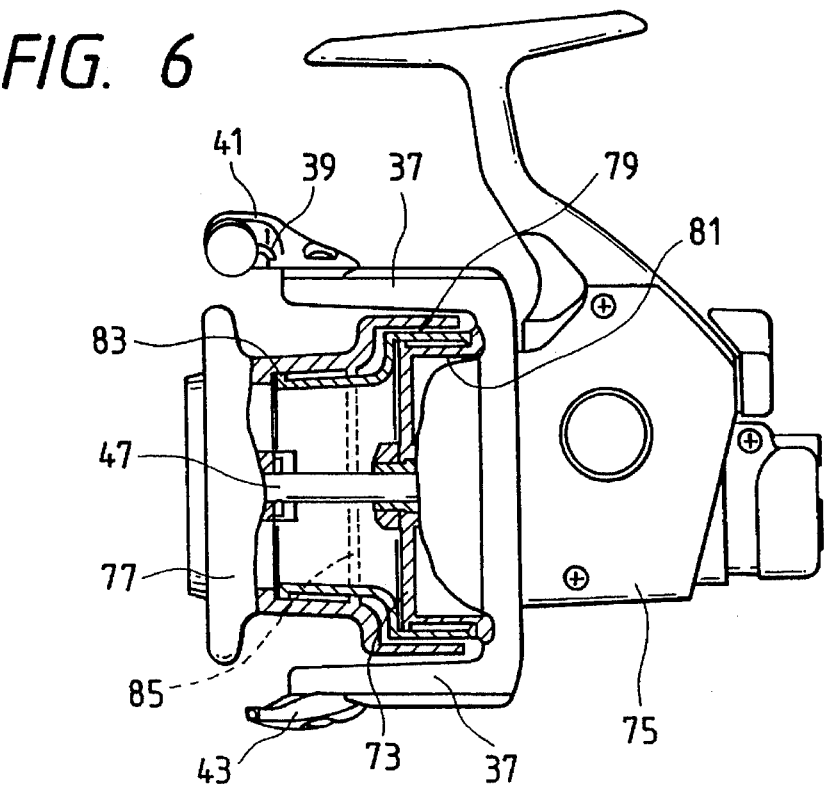
FIG. 6 is a partial cutaway elevational view of a third embodiment of the spinning reel for fishing according to the present invention.
Figure 7:
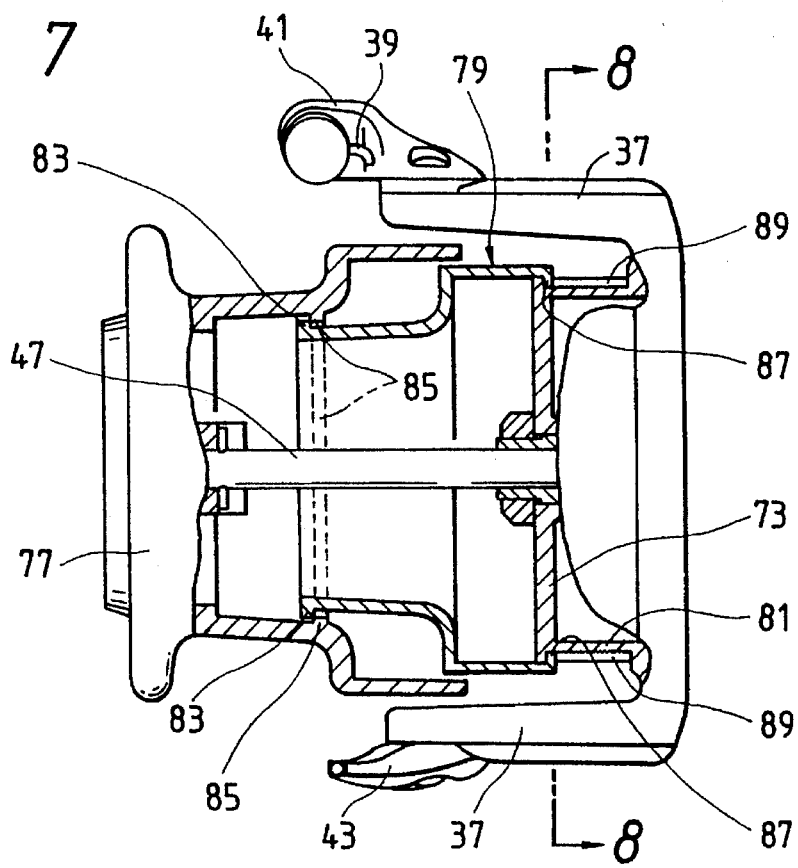
FIG. 7 is a cutaway elevational view of the principal part of the spinning reel for fishing shown in FIG. 6.
Figure 8:
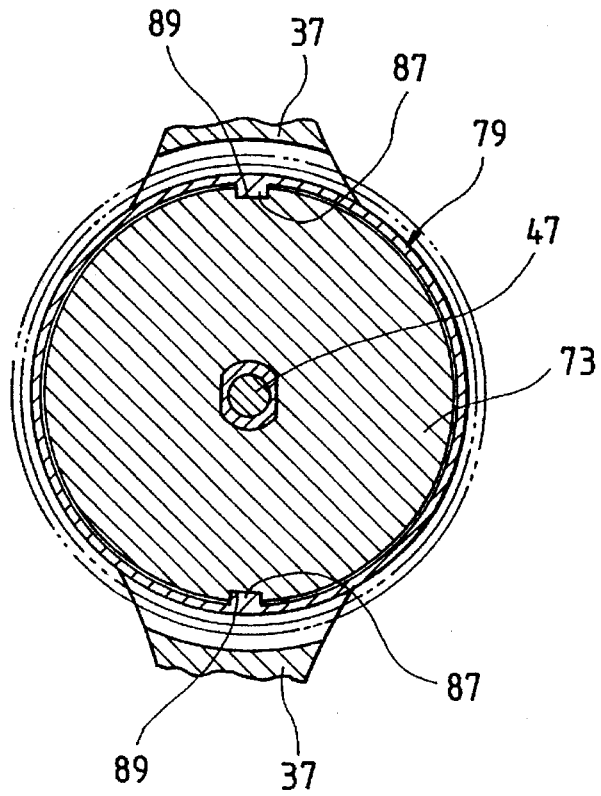
FIG. 8 is a sectional view taken along line 8—8 of FIG. 7.

FIGS. 6 through 8 show a third embodiment of the spinning reel for fishing according to the present invention, wherein a restrainer in a cylindrical form in place of the restrainer 53 is fitted in between the spool and the rotor.

Referring to FIG. 6, this embodiment will subsequently be described, wherein like reference characters designate like component parts in the first embodiment and the description thereof will be omitted.

In FIG. 6, reference numeral 73 denotes a rotor rotatably fitted to a reel body 75; and 77, a spool supported with the spool shaft 47. As in the first embodiment, a fishing line is wound on the spool 77 as the rotor 73 rotates. The spool 77 in this embodiment has no cylindrical portion 59 like what is shown in the first embodiment.

In FIG. 6, further, reference numeral 79 denotes a cylindrical resin-molded restrainer substantially similar in configuration to the inner wall of the spool 77 and as shown therein, the restrainer 79 is placed along the inner periphery of the spool 77 and in between the inner periphery of the spool 77 and the cylindrical base portion 81 of the rotor 73. The rear end of the restrainer 79 is extended up to the base side of the bail support arms 37.

As shown in FIG. 7, a pair of retaining members 83 are outwardly projected from the forward open edge of the restrainer 79 and arranged at an angular interval of 180° intervals. An annular retaining portion 85 for retaining the retaining portions 83 is inwardly projected from the inner periphery of the spool 77 so as to move the restrainer 79 forward when the spool 77 is moved forward by turning the manually operated handle, which will be explained later in more detail.

On the other hand, the cylindrical base portion 81 of the rotor 73 is, as shown in FIGS. 7 and 8, formed with guide grooves 89 in the axial direction of the spool shaft 47, so that mating portions 87 inwardly provided at the rear end open edge of the restrainer 79 and arranged at an angular interval of 180° movably engage with the respective guide grooves 89. When the manually operated handle is turned to cause the spool 77 moving forward to move the restrainer 79 forward, the restrainer 79 rotating together with the rotor 73 moves along the guide grooves 89, and when the spool 77 is completely extended as shown in FIG. 7, the restrainer 79 extends across the gap between the cylindrical base portion 81 and the inner periphery of the spool 77, whereby a fishing line is prevented from being wound on the spool shaft 47. Then the restrainer 79 is pushed back to the original position as shown in FIG. 6 as the spool 77 is moved back.

With the arrangement in this embodiment, the spool 77 makes the reciprocating motion while the fishing line is being wound up thereon, and when the spool 77 moves forward as shown in FIG. 7, the retaining portion 85 on the spool side 77 is brought into engagement with the retaining portions 83 of the restrainer 79 rotating together with the rotor 73 to cause the restrainer 79 to move in the same direction. When the spool 77 is moved back, the restrainer 79 rotating together with the rotor 73 is pushed back to the original position of FIG. 6.

In case the fishing line tries to enter the gap between the spool 77 and the rotor 73 due to tensional fluctuation and the twisting of the fishing line, the restrainer 79 extends across the gap between the inner periphery of the spool 77 and the cylindrical base portion 81 of the rotor 73 to prevent the fishing line from being caught by the spool shaft 47 as shown in FIGS. 6 and 7.

Thus, it is possible to surely prevent the undesirable fishline catch. With the restrainer 79 in this embodiment shown in FIG. 7, the entry of the fishing line is positively prevented on the base side of the bail support arms 37 in contrast to the restrainer 53 shown in FIG. 4, and this ensures that the fishing line can be prevented from entering the spool 77.

As in the case of the first embodiment, the restrainer 79 in this embodiment is allowed to smoothly move back and forth without being affected by the deformation of the bail support arm 37, the sticking of sand thereto and the like. Therefore, the movements of the spool 77 and the rotor 73 are made free from any trouble. When the spool 77 is moved up to the forward endmost side as shown in FIG. 7, there is substantially no possibility that the weight of the whole reel may increase even when the stroke of the spinning reel is lengthened since it is only needed to adapt the restrainer 79 in such a way as to extend across the gap between the inner periphery of the spool 77 and the leading end of the cylindrical portion 81.

Figure 9:
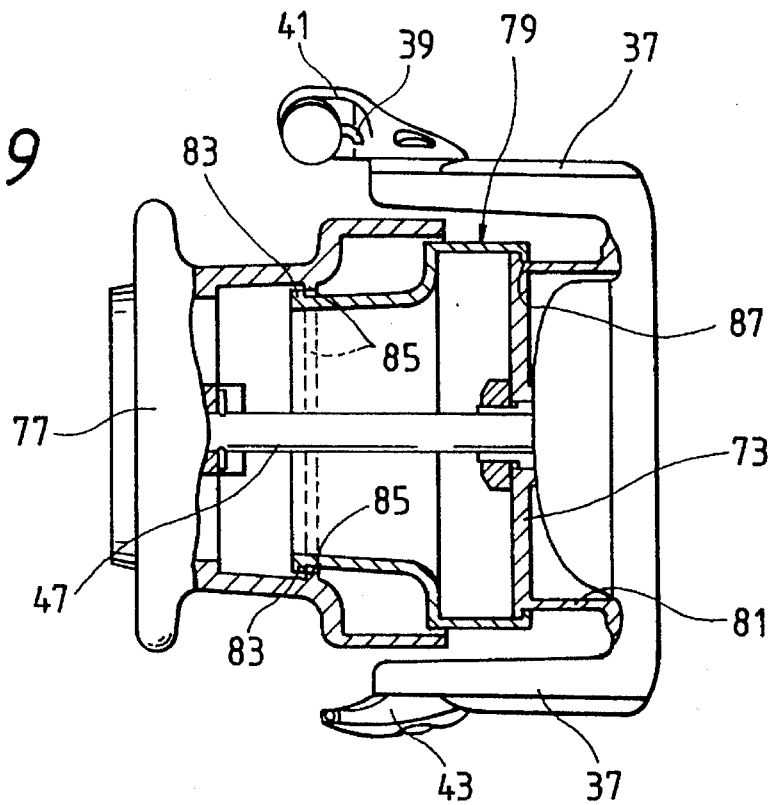
FIG. 9 is a cutaway elevational view of the principal part of a fourth embodiment of the spinning reel for fishing according to the present invention.

FIG. 9 shows a fourth embodiment of the spinning reel for fishing according to the present invention, which is a modification of the third embodiment. In the third embodiment, the guide grooves 89 are formed in the cylindrical base portion 81 of the rotor 73 and the mating portions 87 of the restrainer 79 engage therewith so that the restrainer 79 rotates in linking with the rotation of the rotor 73. Functionally, the restrainer 79 need not be rotated together with the rotor, however.

Therefore, the guide grooves 89 of the third embodiment are dispensed with in the fourth embodiment. That is to say, instead of providing the guide grooves 89 on the outer periphery 81 of the rotor 73, the mating portions 87 are simply set on the cylindrical base portion 81 freely movably in this embodiment as shown in FIG. 9. In this case, the restrainer 79 is movably fitted to the cylindrical base portion 81, so that the rotational torque of the rotor 73 is not transmitted to the restrainer 79.

When the spool 77 is moved forward as the fishing line is wound thereon, the retaining portion 85 on the spool side 77 engages with the retaining portions 83 of the restrainer 79 and the restrainer 79 is caused to move in the same direction. When the spool 77 is moved back, the restrainer 79 is pushed back to the original position.

In case the fishing line tries to enter the gap between the spool 77 and the rotor 73 due to tensional fluctuation and the twisting of the fishing line, the restrainer 79 extending across the gap between the inner periphery of the spool 77 and the cylindrical base portion 81 of the rotor 73 prevents the fishing line from being caught by the spool shaft 47 likewise as in the embodiment shown in FIG. 7.

As in the third embodiment, the fishing line is also prevented from being caught by the spool shaft 47 without any trouble to the operation of winding or releasing the fishing line in this embodiment. Moreover, there is no possibility that the weight of the whole reel may increase even when the stroke of a spinning reel is lengthened.

Figure 10:
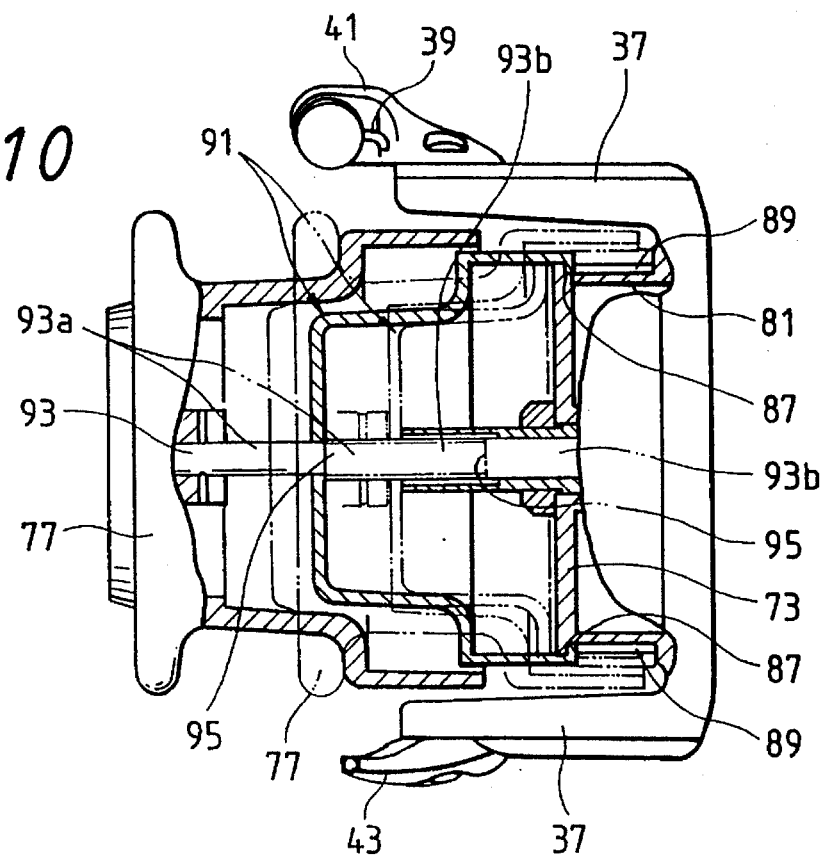
FIG. 10 is a cutaway elevational view of the principal part of a fifth embodiment of the spinning reel for fishing according to the present invention.

FIG. 10 shows a fifth embodiment of the spinning reel for fishing according to the present invention. Although the retaining portion 85 for moving the restrainer 79 is provided on the inner periphery of the spool 77 in the third embodiment, it is characterized in this embodiment that the retaining portion for moving the restrainer is provided on the spool shaft instead of the spool.

Referring to FIG. 10, a description will subsequently be given of the fifth embodiment, wherein like reference characters designate like component parts in the third embodiment and the description thereof will be omitted.

In FIG. 10, reference numeral 91 denotes a closed-end restrainer substantially in a cup-shape, that has been resin-molded into substantially the same profile as the inside of the spool 77, and the restrainer 91 is placed along the inner periphery of the spool and in between the spool 77 and the cylindrical base portion 81 of the rotor 73. Further, the rear end of the restrainer 91 is extended up to the base of the bail support arms 37 and there are formed, at the rearward open edge of the restrainer 91, mating portions 87 which engage with the respective guide grooves 89 provided on the outer periphery of the cylindrical base portion 81 of the rotor 73. The mating portions 87 are arranged at an angular interval of 180°. By means of the mating portion 87 and the guide grooves 89, the restrainer 91 rotates together with the rotor 73 when the fishing line is wound up.

A spool shaft 93 for supporting the spool 77 is passed through the center of the restrainer 91 and includes a small diameter portion 93a passing through, the restrainer 91 and a large diameter portion 93b on the rotor side 73. When the spool is moved forward, a stepped portion where the small diameter portion 93a meets with the large diameter portion 93b functions as a retaining portion 95 for causing the restrainer 91 to move in the same direction.

When the spool 77 is moved forward as the fishing line is wound up, the retaining portion 95 is brought into engagement with the restrainer 91, and thus the restrainer 91 moves in the same direction even in this embodiment. When the spool 77 is moved back, the restrainer 91 is pushed back to the original position.

In case the fishing line tries to enter the gap between the spool 77 and the rotor 73 due to tensional fluctuation and the twisting of the fishing line, the restrainer 79 extending across the gap between the spool shaft 93 and the cylindrical base portion 81 of the rotor 73 prevents the fishing line from being caught by the spool shaft 47.

Thus, the intended purpose can also be accomplished in this embodiment as in the third one.

Figure 11:
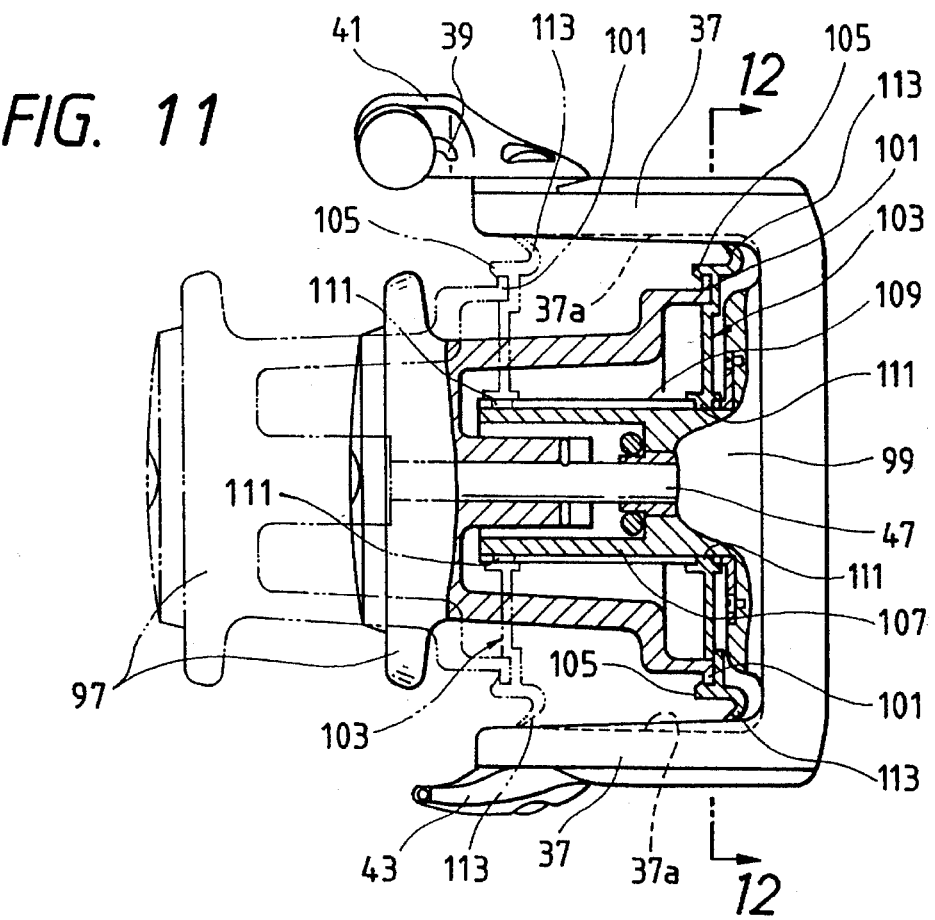
FIG. 11 is a cutaway elevational view of the principal part of a sixth embodiment of the spinning reel for fishing according to the present invention.
Figure 12:
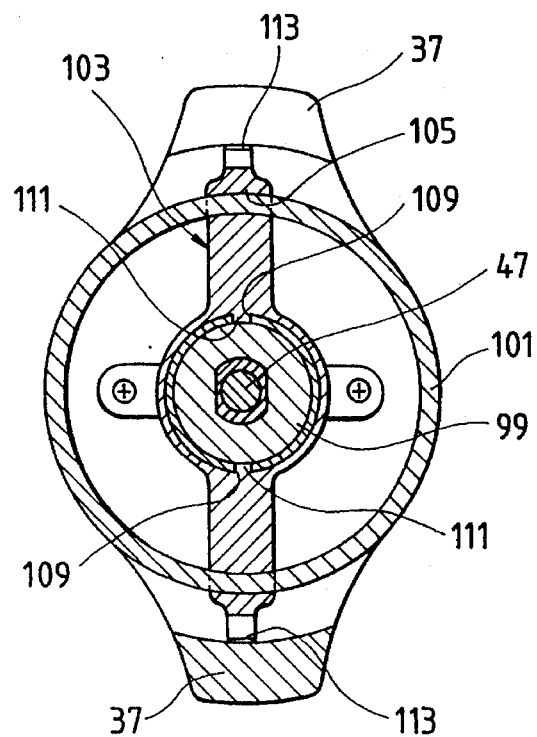
FIG. 12 is a sectional view taken along line 12—12 of FIG. 11.

FIGS. 11 and 12 show a sixth embodiment of the spinning reel for fishing according to the present invention. In FIGS. 11 and 12, reference numeral 97 denotes a spool supported by the spool shaft 47; and 99, a rotor. As in each preceding embodiment, the longitudinal reciprocating motion of the spool 97 is made in linking with the rotation of the rotor 99. Further, retaining portions 101 are formed at the rear end peripheral edge of the spool 97 to protrude radially outwardly, and a restrainer 103 is retained by the retaining portions 101 by means of retaining portions 105.

As shown in FIG. 12, the restrainer 103 is a plate-like plastic member fitted onto the cylindrical portion 107 of the rotor 99, and is formed with mating portions 111 which engage with respective guide grooves 109 provided, at an angular interval of 180°, in the outer periphery of the cylindrical portion 107. The mating portions 111 are movable in the axial direction of the spool shaft 47 along the guide grooves 109. The retaining portions 105 respectively located on both sides of the restrainer 103 is kept in engagement with the retaining portion 101 of the spool 97 as noted previously, so that the restrainer 103 is coupled to the spool 97 to reciprocate together with the spool 97.

In addition, elastic restraining projections 113 respectively formed at both ends of the restrainer 103 contact the inner walls 37a of the respective bail support arms 37 and restrain the fishing line trying to enter the gap between the bail support arms 37 and the spool 97.

With the arrangement in this embodiment, the restrainer 103 is allowed to reciprocate together with the rotor 99 when the spool 99 longitudinally reciprocates as the fishing line is wound up.

The restraining projections 113 of the restrainer 103 prevent the fishing line trying to enter the gap between the bail support arms 37 and the spool 97 due to tensional fluctuation and the twisting of the fishing line from being caught by the spool shaft 47.

Thus, it is possible to prevent the undesirable line catch without causing any trouble to the operation of winding or releasing the fishing line in this embodiment. Moreover, there is no possibility that the weight of the whole reel may increase even when the stroke of the spinning reel is lengthened.

According to this embodiment, moreover, the advantage is that the restrainer 103 is not only lighter than those described by reference to the preceding embodiments but also capable of restraining the fishing line at a more preferable position.

Further, the provision of the elastic restraining projections 113 on the restrainer 103 can permit the deformation of the support arms 37 without causing any trouble in operation. That is to say, even though the support arms 37 is deformed due to the large load in winding the fishline onto the spool 97, the elastic restraining projections 113 contacting the support arms 37 absorb such deformation of the support arms 37 to make the operation of the restrainer 103 free from such deformation.

Figure 13:
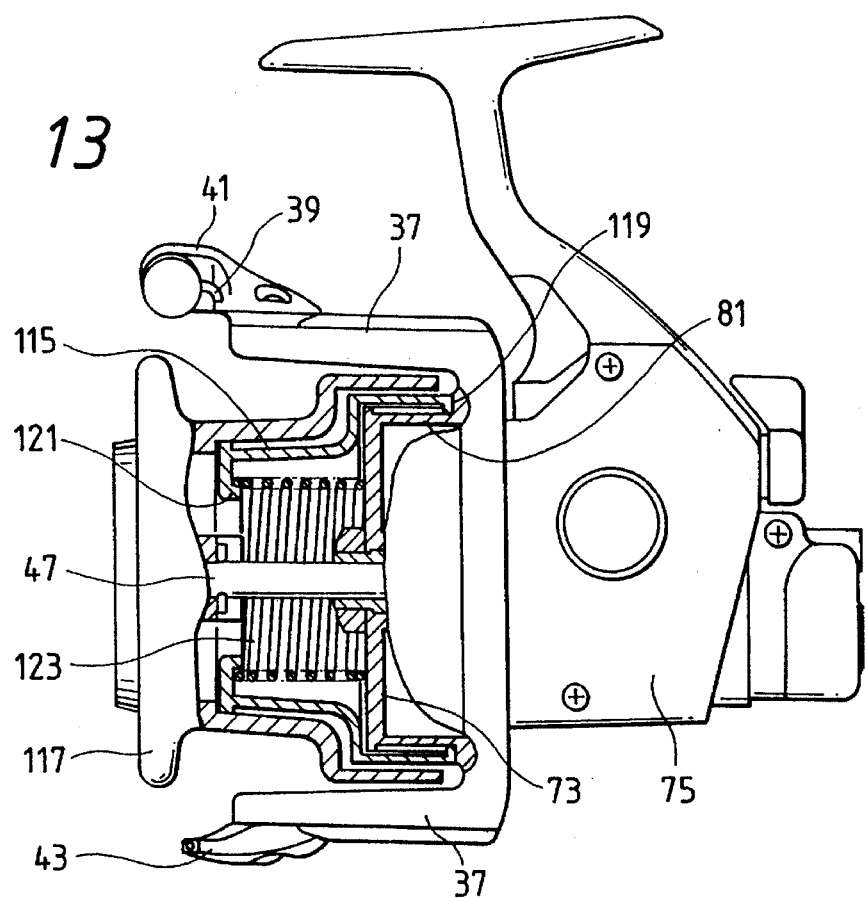
FIG. 13 is a partial cutaway elevational view of a seventh embodiment of a spinning reel for fishing according to the present invention.
Figure 14:
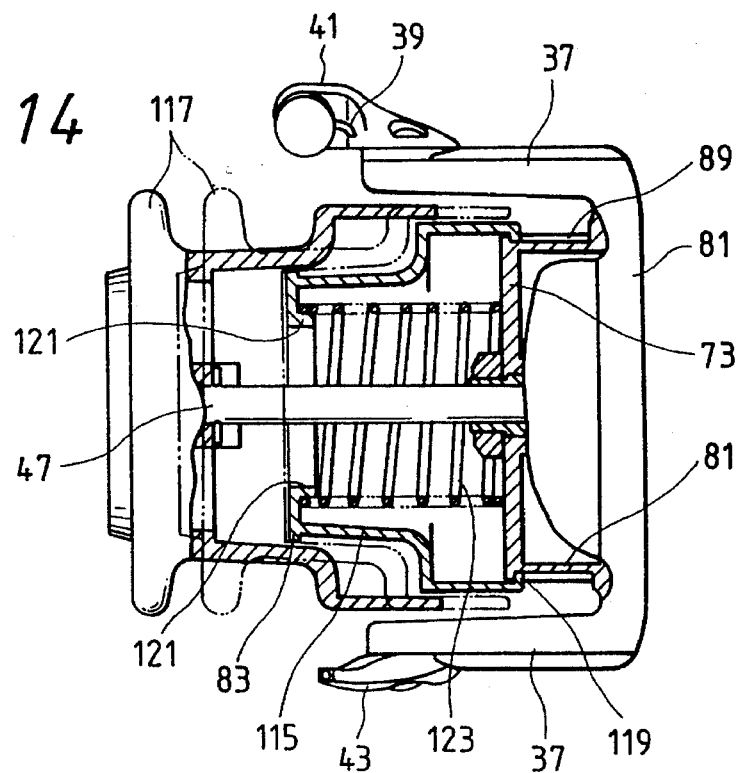
FIG. 14 is a cutaway elevational view of the principal part of the spinning reel for fishing shown in FIG. 13.

FIGS. 13 and 14 show a seventh embodiment of the spinning reel according to the present invention, which is characterized in that a spring member, in place of the retaining portion 85 of FIG. 6, is employed as a means for making a restrainer follow the movement of a spool.

Referring to FIGS. 13 and 14, a description will subsequently be given of this embodiment, wherein like reference characters designate like component parts in the embodiment shown in FIGS. 6 through 8 and the description thereof will be omitted.

In FIG. 13, reference numeral 115 denotes a restrainer which is similar to the restrainer 79 of FIG. 6 and formed into substantially the same profile as the inside of a spool 117. The restrainer 115 is placed along the inner periphery of the spool 117 and in between the spool 117 and the cylindrical base portion 81 of the rotor 73, the rear end of the restrainer 115 being extended up to the base of the bail support arms 37. Further, mating portions 119 for engaging with the respective guide grooves 89 of the rotor 73 are provided at the rear end open edge of the restrainer 115, the mating portions 119 being projected radially inwardly and arranged at the 180° interval. On the other hand, an annular spring holding portion 121 centering around the spool shaft 47 is projected axially inwardly (i.e. toward the rotor 73) at the forward open edge of the restrainer 115.

A coil spring 123 for consistently urging the restrainer 115 away from the rotor 73 and forcing it to contact the spool 117 is extended along the spool shaft 47 and interposed between a spring holding member 121 and the rotor 73. When the spool 117 is moved forward by turning the manually operated handle, the restrainer 115 moves in the same direction by the force of the coil spring while it rotates together with the rotor 73. As shown in FIG. 14, the restrainer 115 extends across the gap between the cylindrical base portion 81 and the inner periphery of the spool 117 when the spool 117 is moved up to the forward end, and prevents the fishing line from being caught by the spool shaft 47. When the spool 117 is moved back, the restrainer 115 is pushed back to the original position against the urging force of the coil spring 123.

With the arrangement in this embodiment, the fishing line is wound on the spool 117 making the reciprocating motion linking with the rotation of the rotor 73 by turning the manually operated handle 49 after the bail 39 is brought down toward the fishing-line winding position. When the spool. 117 is moved forward as mentioned above, the restrainer 115 follows the movement of the spool 117 and moves in the same direction because of the force of the coil spring 123 while rotating together with the rotor 73. When the spool 117 is moved back, the restrainer 115 is pushed back to the original position against the force of the coil spring 123.

Even when the fishing line tries to enter the gap between the spool 117 and the bail support arms 37 of the rotor 73 due to tensional fluctuation and the twisting of the fishing line, the restrainer 115 extends across the gap between the cylindrical base portion 81 and the inner periphery of the spool 117 and prevents the fishing line from being caught by the spool shaft 47. Moreover, the coil spring 123 keeps forcing the restrainer 115 to contact the spool 117, thus positively preventing the restrainer 115 from clattering during the fishing operation.

As in any one of the preceding embodiments, the fishing line is also prevented from being caught by the spool shaft 47 without causing any trouble to the operation of winding or releasing the fishing line in this embodiment. Moreover, it is possible to prevent the increase of the weight of the whole reel even when the stroke of a spinning reel is lengthened. In addition to the above effects, another advantage is that noise generated by the clattering of the restrainer 115 can be obviated.

Figure 15:
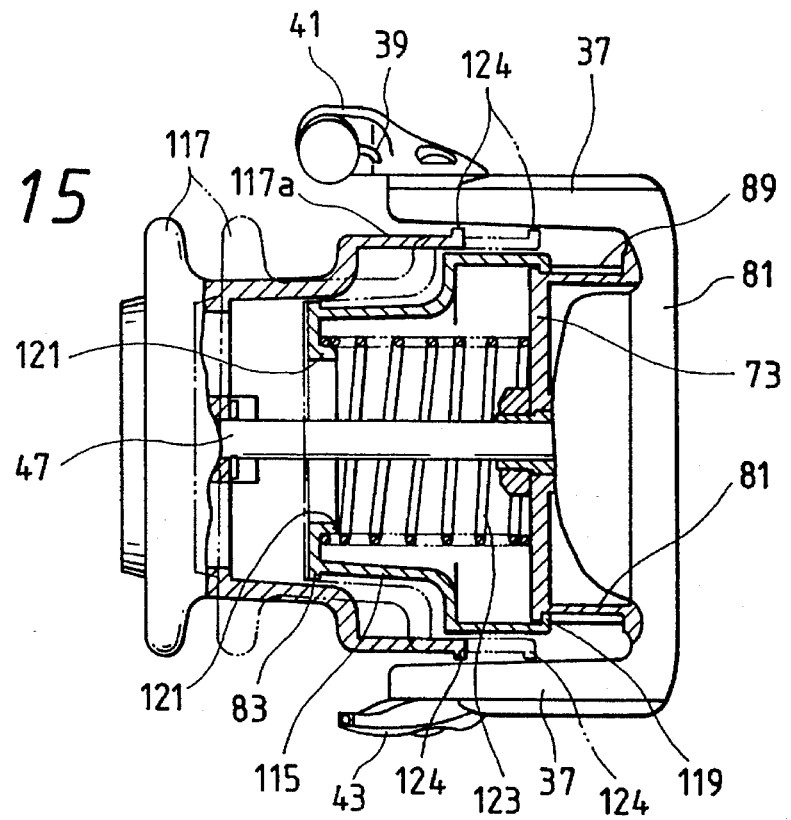
FIG. 15 is a cutaway elevational view of the principal part of an eighth embodiment of the spinning reel for fishing shown according to the present invention.

A further acceptable arrangement is, as shown in FIG. 15 illustrating an eighth embodiment of the present invention, to provide a plurality of retaining projections 124 on the rear end outer periphery of the cylindrical portion 117a of a spool in such a way that the retaining projections 124 are formed integrally or separately at appropriate intervals in the circumferential direction, or otherwise annularly over the whole outer periphery thereof.

With such an arrangement, the effect that can be anticipated thereby is superior to what is achievable in the embodiment of FIG. 13 since the provision of the retaining projections 124 makes it possible to prevent the fishing line from falling into the rear side of the spool 117.

Figure 16:
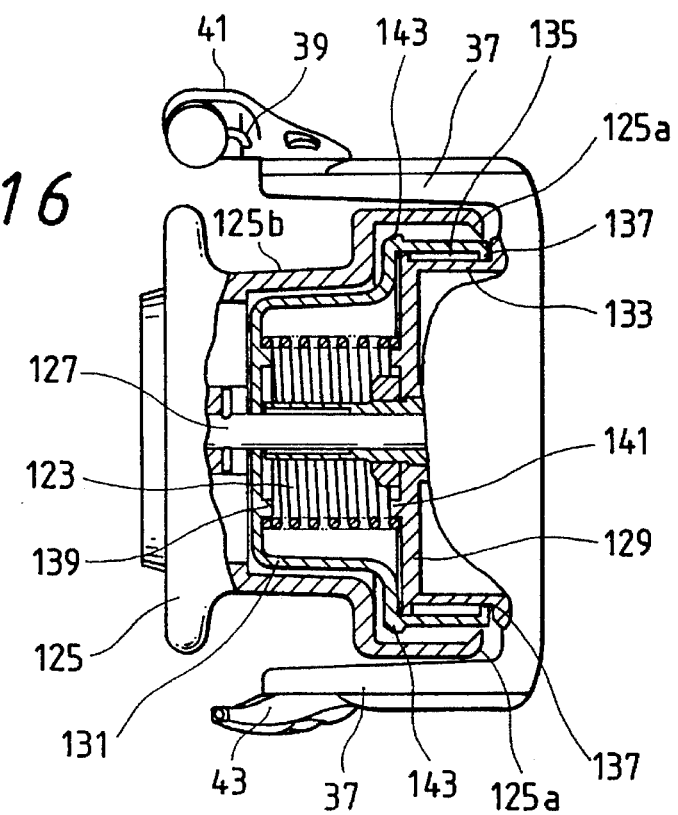
FIG. 16 is a partial cutaway elevational view of a ninth embodiment of the spinning reel for fishing according to the present invention.
Figure 17:
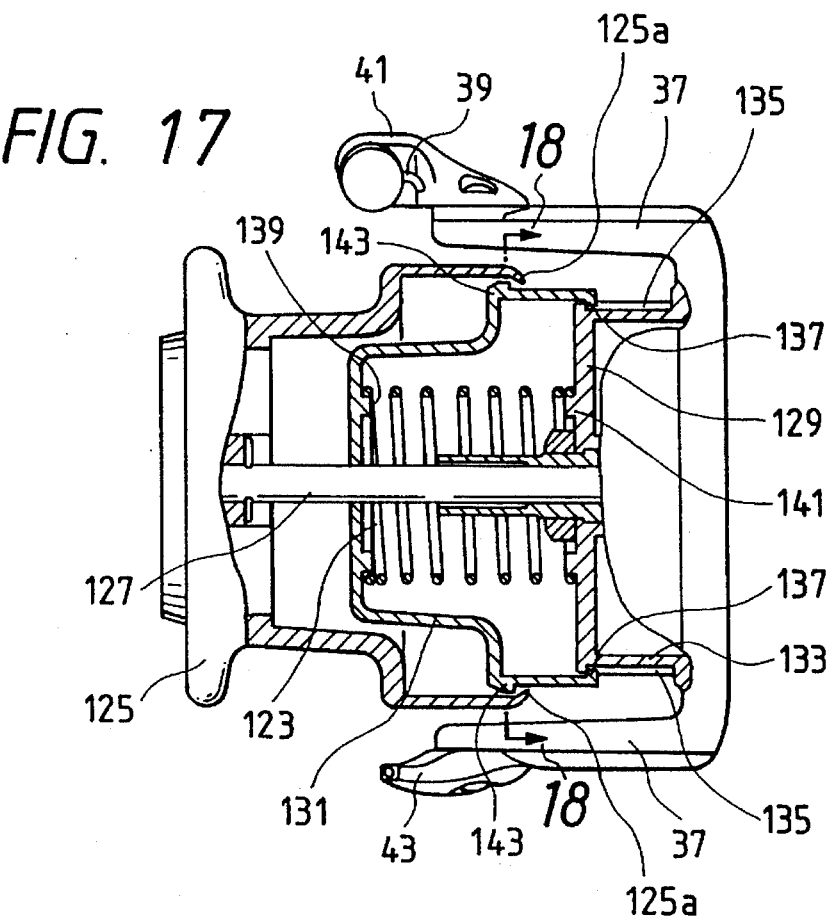
FIG. 17 is a cutaway elevational view of the principal part of the spinning reel for fishing shown in FIG. 16.
Figure 18:
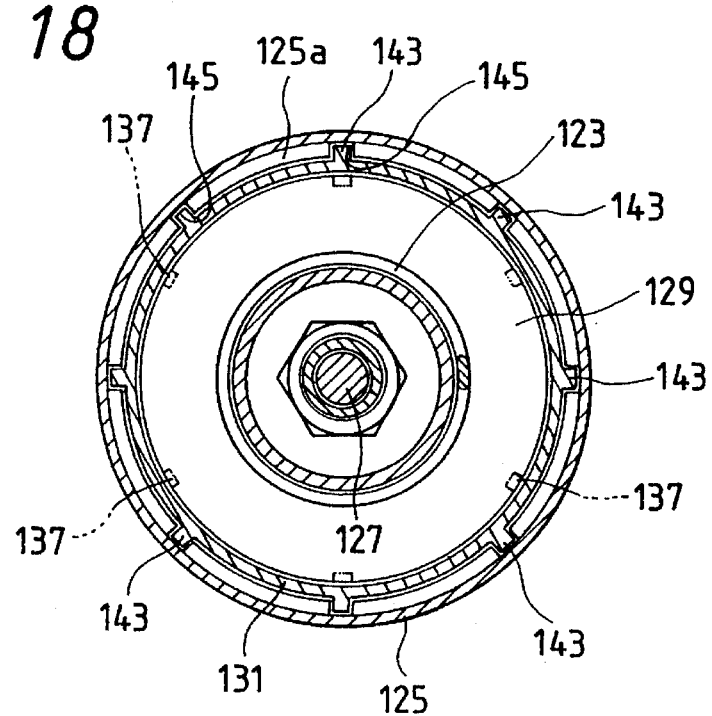
FIG. 18 is a sectional view taken along line 18—18 of FIG. 17.

FIGS. 16 through 18 show a ninth embodiment of the spinning reel according to the present invention, which is characterized in that a spring member, in place of the retaining portion 95 of FIG. 10, is employed as a means for making a restrainer follow the movement of a spool likewise and that the profiles of the restrainer and the spool are slightly altered in this embodiment.

Referring to FIGS. 16 through 18, a description will subsequently be given of this embodiment, wherein like reference characters designate like component parts in the embodiment shown in FIG. 10 and the description thereof will be omitted.

In FIG. 16, reference numeral 125 denotes a spool supported by a spool shaft 127 and concentric to a rotor 129; and 131, a closed-end restrainer that has been molded substantially into the same profile as the inside of the spool 125 and is placed along the inner periphery of the spool 125 between the spool 125 and the cylindrical base portion 133 of the rotor 129. Further, mating portions 137 for engaging with respective guide grooves 135 arranged in the cylindrical base portion 133 of the rotor 129 are provided at the rear end open edge of the restrainer 131 extended up to the base of the bail support arms 37, the mating members 137 being projected radially inwardly and arranged at the 180° interval.

Further, the spool shaft 127 is passed through the center of the leading-end side of the restrainer 131, and annular spring holding portions 139 and 141 centering around the spool shaft 127 are respectively formed on the forward inner face of the restrainer 131 and the rotor 129 located opposite thereto. The coil spring 123 for consistently urging the restrainer 131 and forcing it to contact the spool 125 is stretched in between the spring holding members 139 and 141. When the spool 125 is moved forward by turning the manually operated handle, the restrainer 131 moves in the same direction while rotating together with the rotor 129.

When the spool 125 is moved up to the forward endmost side as shown in FIG. 17, the restrainer 131 extends across the gap between the cylindrical base portion 133 of the rotor 129 and the inner periphery of the spool 125 so as to prevent the fishing line from being caught by the spool shaft 127.

Then the restrainer 131 is pushed back to the original position against the force of the coil spring 123 as the spool 125 is moved back.

The above arrangement in this embodiment further includes a plurality of projections 143 provided on the outer periphery of the restrainer 131 so as to restrain the entry of the fishing line.

FIG. 18 is a sectional view taken along line 18—18 of FIG. 17, wherein reference numeral 145 denotes cutouts or notches formed in the rear end peripheral edge 125a of the spool 125, the cutouts respectively corresponding to the projections 143. The restrainer 131 is inserted into the inside of the spool 125 such that the projections 143 into each cutout 145.

As shown FIG. 16, the rear end peripheral edge 125a of the spool 125 is inwardly tilted, and consequently, this inwardly tilting configuration of the rear end peripheral edge 125a can permit an angler to easily pull up the fishing line that has been displaced to the rear end peripheral edge 125a to the fishing-line winding portion 125b of the spool 125.

With the arrangement above in this embodiment, the restrainer 131 is caused to follow the spool 125. That is, when the latter is moved forward, the restrainer 131, while rotating together with the rotor 129, moves in the same direction because of the force of the coil spring 123. When the spool 125 is moved back, on the other hand, the restrainer 131 is pushed back to the original position against the force of the coil spring 123.

Even when the fishing line tries to enter the gap between the spool 125 and the bail support arms 37 of the rotor 129 due to tensional fluctuation and the twisting of the fishing line, the restrainer 131 extends across the gap between the cylindrical portion 133 and the inner periphery of the spool 125 and prevents the fishing line from being caught by the spool shaft 127. Further, each of the projections 143 on the outer periphery of the restrainer 131 also prevents the fishing line from advancing toward the spool shaft 127. Moreover, the coil spring 123 keeps forcing the restrainer 131 to contact the spool 125, thus preventing the restrainer 131 from clattering during the fishing operation.

As in the embodiment shown in FIG. 13, the fishing line is also prevented from being caught by the spool shaft 127 without causing any trouble to the operation of winding or releasing the fishing line and noise generated due to the clattering of the restrainer 131 can be obviated likewise in this embodiment.

This embodiment is advantageous in that since the rear end peripheral edge 125a of the spool 125 is inwardly tilted, the fishing line that has been fallen to the rear end peripheral edge 125a can easily be pulled up to the fishing-line winding portion 125b of the spool 125 by making use of its configuration.

Figure 19:
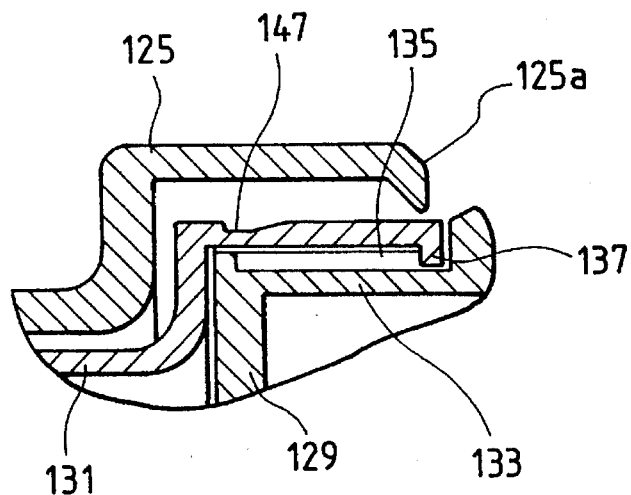
FIG. 19 is a sectional view of the principal part of a modification of the spinning reel for fishing shown in FIG. 16.
Figure 20:
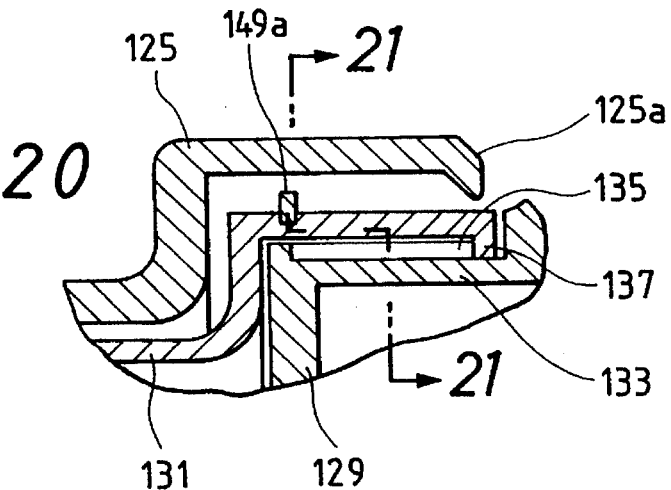
FIG. 20 is a sectional view of the principal part of another modification of the spinning reel for fishing shown in FIG. 16.
Figure 21:
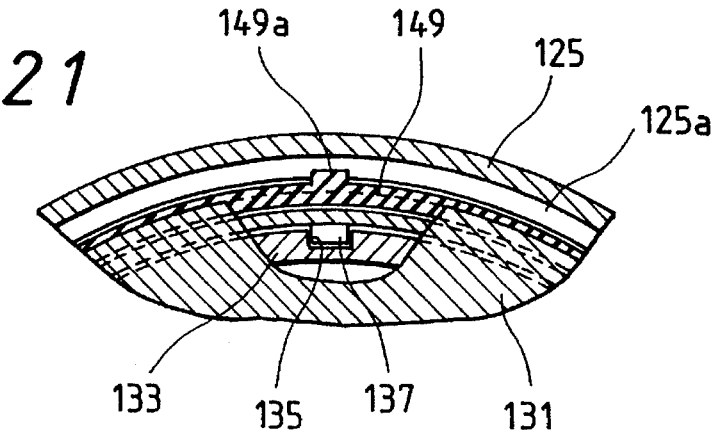
FIG. 21 is a sectional view taken along line 21—21 of FIG. 20.

Incidentally, in place of the projections 143 in the ninth embodiment, an annular recess 147 for retaining the fishing line may be formed on the outer periphery of the restrainer 131 as shown in FIG. 19 to make the restrainer 131 together with the annular recesses 147 restrain the entry of the fishing line toward the spool shaft 127. Otherwise, a rubber ring 149 with a plurality of projections 149a outwardly projected therefrom, instead of the projections 143, may be fitted to the outer periphery of the restrainer 131 to restrain the entry of the fishing line toward the spool shaft 127 as shown in FIGS. 20 and 21.

The intended purpose can also be accomplished in these modifications for the ninth embodiment shown in FIG. 16, and since these modifications make it unnecessary to provide the cutouts 145 in the rear end peripheral edge 125a of the spool 125, the efficiency of adding such a restrainer 131 to the spool 125 is greatly facilitated in comparison with the ninth embodiment of FIG. 16.

Figure 22:
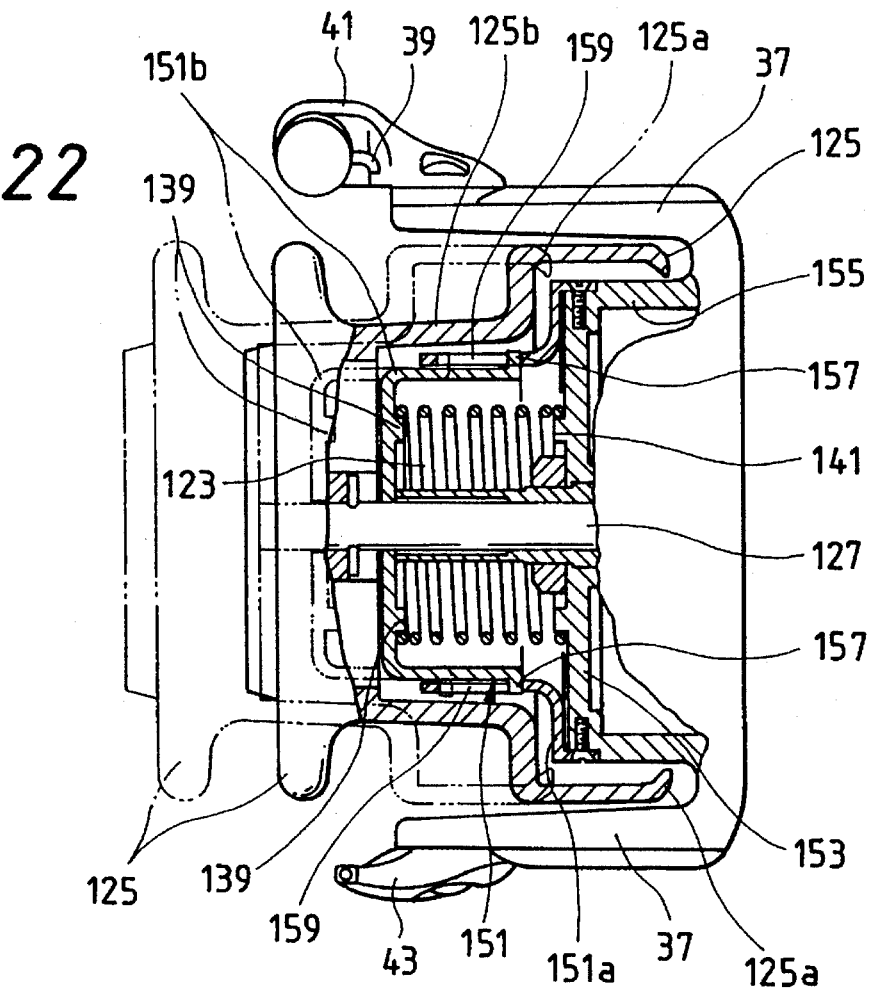
FIG. 22 is a cutaway view of the principal part of a tenth embodiment of a spinning reel for fishing according to the present invention.

FIG. 22 shows a tenth embodiment of a spinning reel for fishing according to the present invention, wherein the restrainer 131 shown in FIG. 16 is made up of separatable two elements, i.e. a restrainer base fitted to the cylindrical base portion of the rotor and a movable restrainer member which is longitudinally movably mounted to the restrainer base.

Referring to FIG. 22, a description will subsequently be given of this embodiment, wherein like reference characters designate like component parts in the embodiment shown in FIG. 16 and the description thereof will be omitted.

In FIG. 22, reference numeral 151 denotes a restrainer placed along the inner periphery of the spool 125 and in between the spool 125 and the cylindrical base portion 155 of a rotor 153. The restrainer 151 comprises a restrainer base 151a secured to the cylindrical base portion 155 of the rotor 153 with machine screws and a bowl-shaped movable restrainer member 151b which is urged by the coil spring 123 to the spool 125.

The restrainer base 151a is formed with guide slots 159 extending in the axial direction of the spool shaft 127, and the movable restrainer member 151b is provided with mating portions 157 at the rear end peripheral edge of the movable restrainer member 151b and at the angular interval of 90°, the mating portions 157 movably engaging with the respective guide slots 159. When the spool 125 is moved forward by turning the manually operated handle, the movable restrainer member 151b moves in the same direction because of the force of the coil spring 123 while the restrainer 151 rotates together with the rotor 153.

When the spool 125 is moved up to the forward end, the restrainer base 151a and movable restrainer member 151b of the restrainer 151 extend across the gap between the rotor 153 and the inner periphery of the spool 125 to prevent the fishing line from being caught by the spool shaft 127. When the spool 125 is moved back, the movable restrainer member 151b is pushed back to the original position against the force of the coil spring 123.

With the above arrangement in this embodiment, even when the fishing line tries to enter the gap between the spool 125 and the bail support arms 37 of the rotor 153 due to tensional fluctuation and the twisting of the fishing line, the restrainer 151 prevents the fishing line from being caught by the spool shaft 127 as in the preceding embodiments. Moreover, the coil spring 123 keeps forcing the movable restrainer member 151b to contact the spool 125, thus preventing the restrainer 151 from clattering during the fishing operation.

As similarly to the embodiment shown in FIG. 16, the fishing line is also prevented from being caught by the spool shaft 127 without causing any trouble to the operation of winding or releasing the fishing line and noise generated due to the clattering of the restrainer 131 can be prevented likewise in this embodiment. Further, the fishing line that has been fallen to the rear end peripheral edge 125a can easily be pulled up to the fishing-line winding portion 125b of the spool 125 by making use of its configuration.

Figure 23:
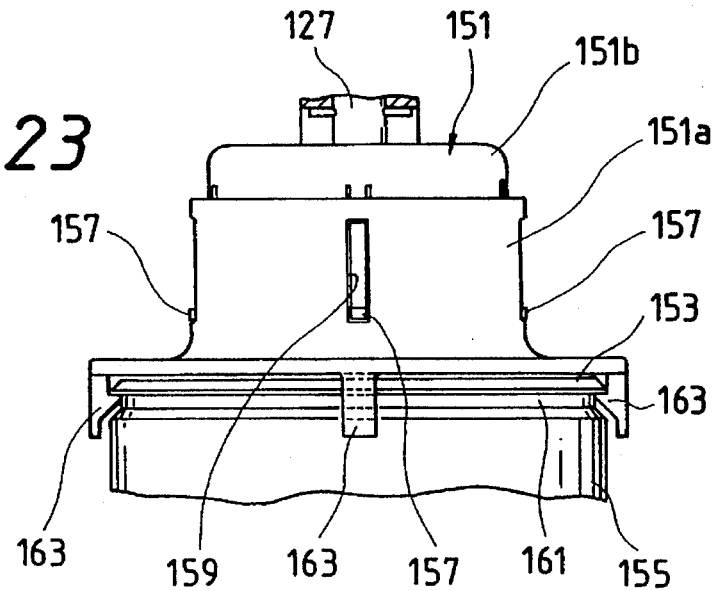
FIG. 23 is an elevational view of the restrainer fitted to an eleventh embodiment of the spinning reel for fishing according to the present invention.
Figure 24:
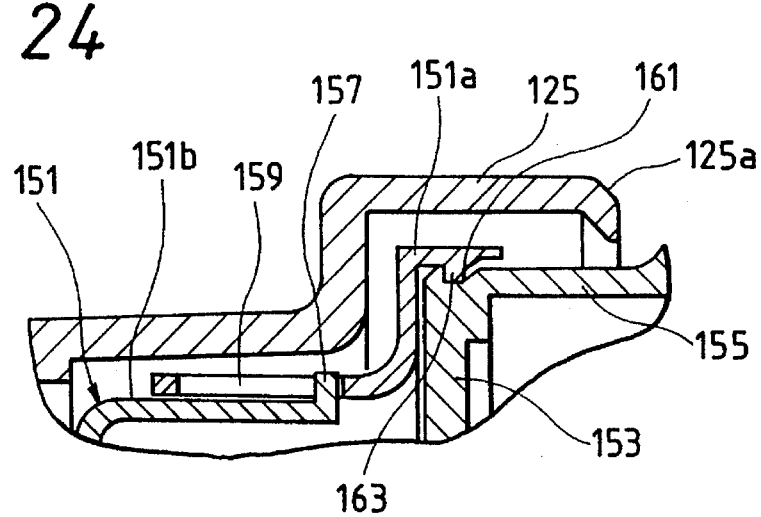
FIG. 24 is a sectional view of the principal part of a spinning reel for fishing fitted with the restrainer shown in FIG. 23.
Figure 25:
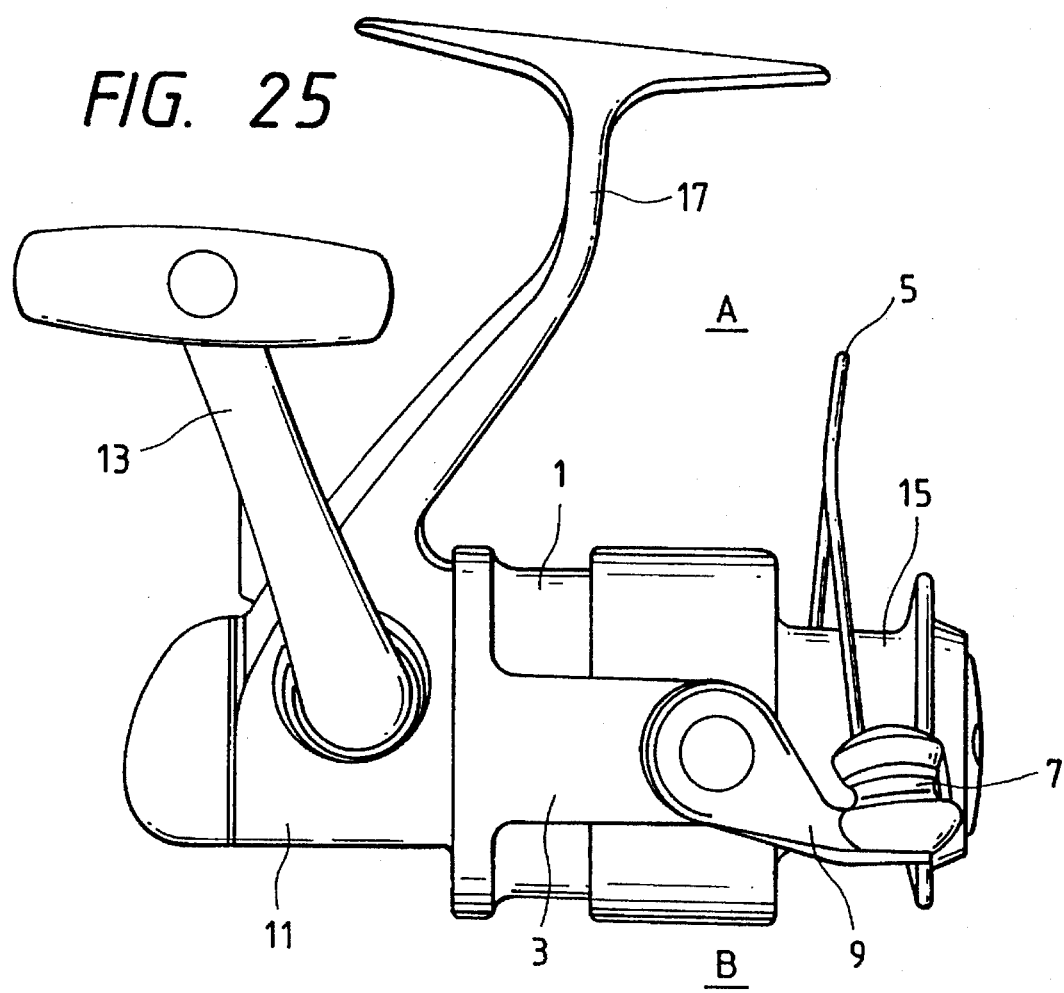
FIG. 25 is an elevational view of a conventional spinning reel for fishing.

FIGS. 23 and 24 show an eleventh embodiment of the present invention, which is a modification of the tenth embodiment shown in FIG. 22. In the eleventh embodiment, an annular mating groove 161 is provided on the outer periphery of the cylindrical base portion 155 of the rotor 153, instead of securing the restrainer base 151a to the rotor 153 with machine screws, and mating projections 163, which engage with the mating grooves 161, are provided on the restrainer base 151a, so that the restrainer base 151a may be attached to the rotor 153 instantly in the simple operation. As the remaining arrangement is similar to what is shown in FIG. 22, like reference characters are given to like component parts in the embodiment shown in FIG. 22 and the description thereof will be omitted.

In this embodiment, the restrainer 151 also prevents the fishing line from being caught by the spool shaft 127 and the coil spring 123 keeps forcing the movable restrainer member 151b to contact the spool 125, whereby the intended purpose can be accomplished likewise as in the embodiment of FIG. 22.

Although the coil spring 123 has been used as a means for making the movable restrainer member 151b follow the movement of the spool 125 in the embodiments of FIGS. 22 through 24, any means such as the retaining portion 85 of FIG. 7, for embodiment, may be employed in place of the coil spring 123.

Figure 28:
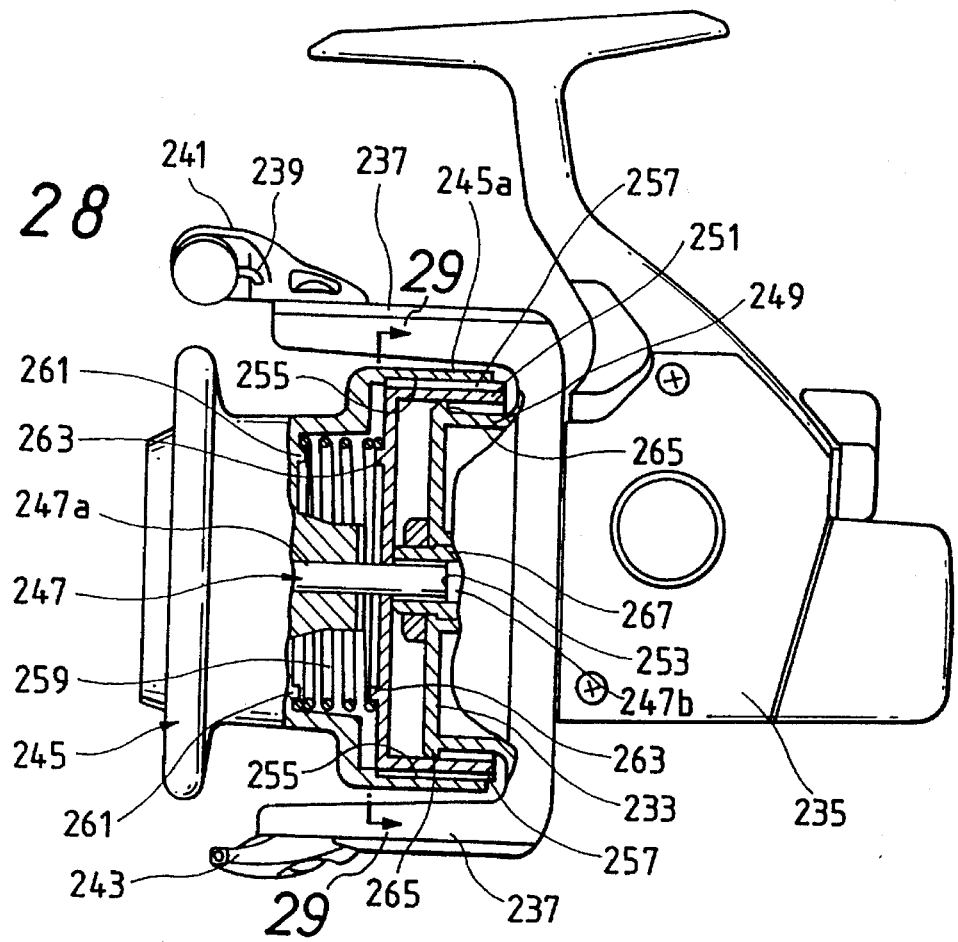
FIG. 28 is a partial cutaway elevational view of a twelfth embodiment of a spinning reel for fishing according to the present invention.
Figure 29:
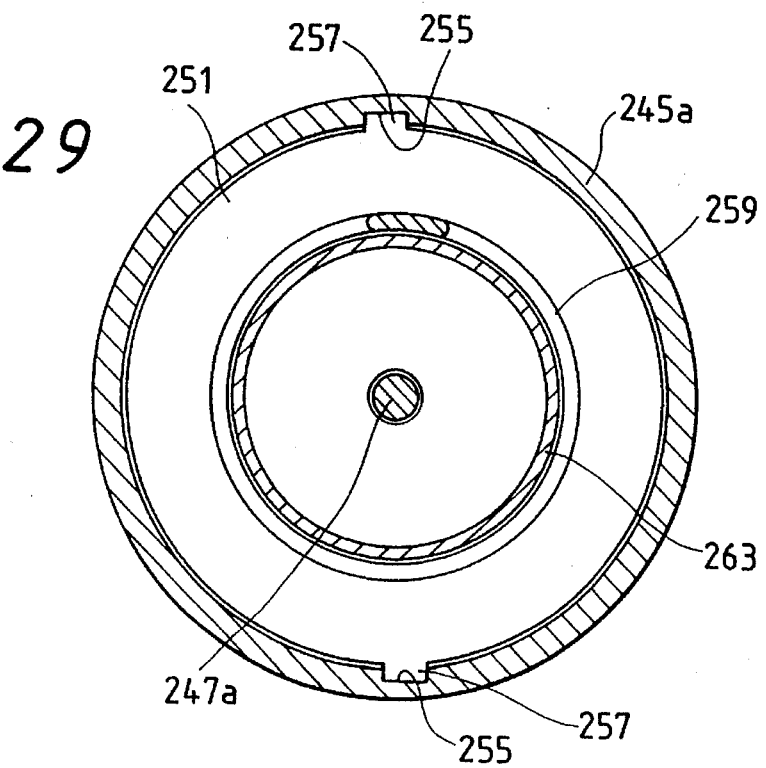
FIG. 29 is a sectional view taken along line 29-29 of FIG. 28.
Figure 30:
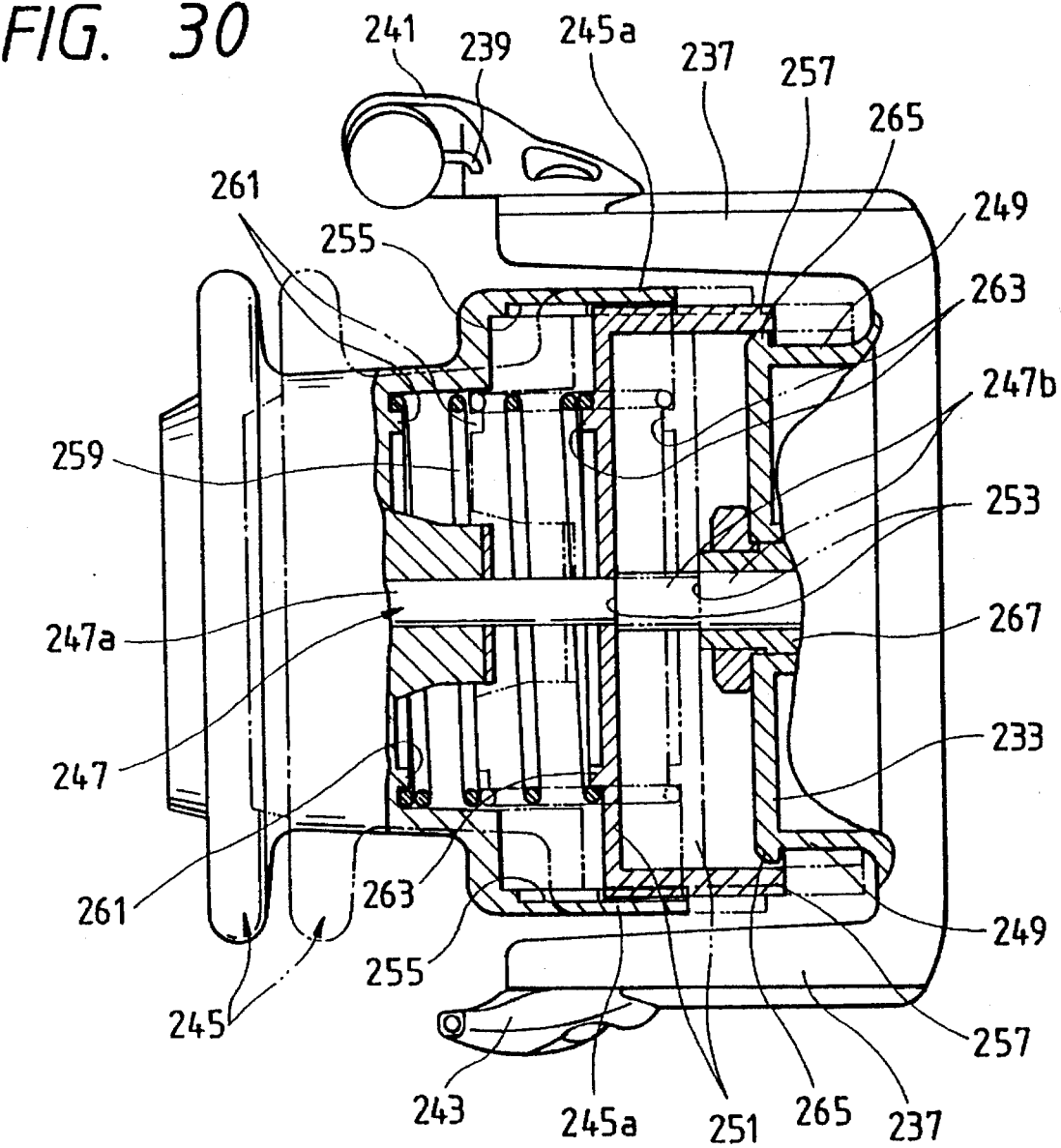
FIG. 30 is a cutaway elevational view of the principal part of the spinning reel for fishing shown in FIG. 28.

FIGS. 28, 29 and 30 show a spinning reel for fishing according to a twelfth embodiment of the present invention. In the twelfth embodiment, a fishing-line entry restrainer 251 for preventing the fishing line from being caught by the spool shaft 247 is fitted between the spool 204 and the cylindrical portion 249 of the rotor 233.

As shown in FIG. 28, the restrainer 251 is a closed-end plastic cylindrical body substantially similar in configuration to the inside of the skirt portion 245a of the spool 245 and its rear end is extended up the base of bail support arms 237. The spool shaft 247 is passed through the center of the restrainer 251. The spool shaft 247 is formed with a small diameter portion 247a passed through the restrainer 251 and a large diameter portion 247b on the side of the rotor 233, so that the stepped portion where the small and large diameter portions 247a and 247b meet functions as a retaining portion 253 for making the restrainer 251 follow the spool 245 being moved forward.

As shown in FIG. 29, guide grooves 255 for guiding the restrainer 251 along the spool shaft 247 when the restrainer 251 is moved are provided at an angular interval of 180° on the inner periphery of the skirt portion 245a of the spool 245. Mating portions 257 provided on the outer periphery of the restrainer 251 are made to slidably engage with the respective guide grooves 255.

As shown in FIG. 30, the restrainer 251 extends across the gap between the cylindrical portion 249 of the rotor 233 and the inner periphery of the skirt portion 245a of the spool 245 when the spool 245 is moved up to the forward end so as to prevent the fishing line from being caught by the spool shaft 247.

In addition to the arrangement above, the spinning reel for fishing in this embodiment is provided with a coil spring 259 between the spool 245 and the restrainer 251 to prevent the restrainer 251 from clattering during the fishing operation.

More specifically, annular spring holding portions 261 and 263 both centering around the spool shaft 247 are formed on the leading-end inner face of the spool 245 and the leading-end surface of the restrainer 251, respectively. The coil spring 259 which keeps urging the restrainer 251 backward, i.e. in the direction toward the rotor 233, is stretched between the coil spring holding members 261 and 263. When the spool 245 is moved forward, the restrainer 251 moves in the same direction against the force of the coil spring 259. At this time, the restrainer 251 is forced to contact the retaining portion 253 because of the force of the coil spring 259 so as to prevent it from clattering. When the spool 245 is moved back, the restrainer 251 is pushed back to the original position shown in FIG. 28 while compressing the coil spring 259.

In FIG. 28, reference numeral 265 denotes retaining projections provided on the outer periphery of the cylindrical base portion 249 of the rotor 233; and 267, a collar shaft of the spool shaft 247. The retaining projections 265 prevent the fishing line from entering the inside of the spool 233 and being caught by the spool shaft 247.

With the above arrangement in this embodiment, the fishing line is wound onto the spool 245 making the reciprocating motion linking with the rotation of the rotor 233 when the manually operated handle is operated to rotate the rotor 233 in a state that the bail 239 is brought down toward the fishing-line winding position. When the spool 245 is moved forward as shown in FIG. 30 (indicated by the solid line), the retaining portion 253 provided on the spool shaft 247 moves the restrainer 251 in the same direction against the force of the coil spring 259, and as the spool 245 moves back, the restrainer 251 is pushed back to the original position of FIG. 28 while compressing the coil spring 259.

Even when the fishing line tries to enter the gap between the skirt portion 245a of the spool 204 and the bail support arms 237 of the rotor 233 due to tensional fluctuation and the twisting of the fishing line, the restrainer 251 extends across the gap between the cylindrical portion 249 of the rotor 233 and the inner periphery of the skirt portion 245a as shown in FIG. 30 so as to prevent the fishing line from being caught by the spool shaft 247. The retaining projections 265 prevent the fishing line from being caught by the spool shaft 247 likewise. When the restrainer 251 is moved back and forth, the coil spring 259 forces the restrainer 251 to contact the retaining portion 253 and the collar shaft 267 to prevent clattering thereof.

Since the restrainer 25 in the prior art example shown in FIG. 26 is moved along the bail support arms 21 which is likely to deform and tends to gather sea water, sand and the like, the disadvantage is that the restrainer 25 is clogged to hinder the smooth motion thereof due to the deformation of the bail support arms 21 and sand sticking thereto and when the restrainer 25 ceases to move smoothly, the movements of the rotor 19 and the spool 23 incorporating the restrainer 25 are badly affected thereby. On the contrary, the restrainer 251 which is movably fitted to the inner face of the spool 245 according to this embodiment is free from such nonconformity.

It is therefore possible to prevent the undesirable line catch without causing any trouble to the movements of the spool 245 and the rotor 233 in this embodiment.

In this embodiment, moreover, the restrainer 251 is formed so that it is made to extend across the gap between the inner periphery of the skirt portion 245a of the spool 245 and the forward end of the cylindrical portion 249 of the rotor 233 when the spool 245 is moved up to the forward end of the spool 45 as shown in FIG. 30 in order to prevent the fishing line from being caught by the spool shaft 247. Therefore, it is possible to overcome the weight increase of the whole reel even when the stroke of a spinning reel is lengthened. Further, noise deriving from the backlash or clattering of the restrainer 251 can be obviated during the fishing operation.

Figure 31:
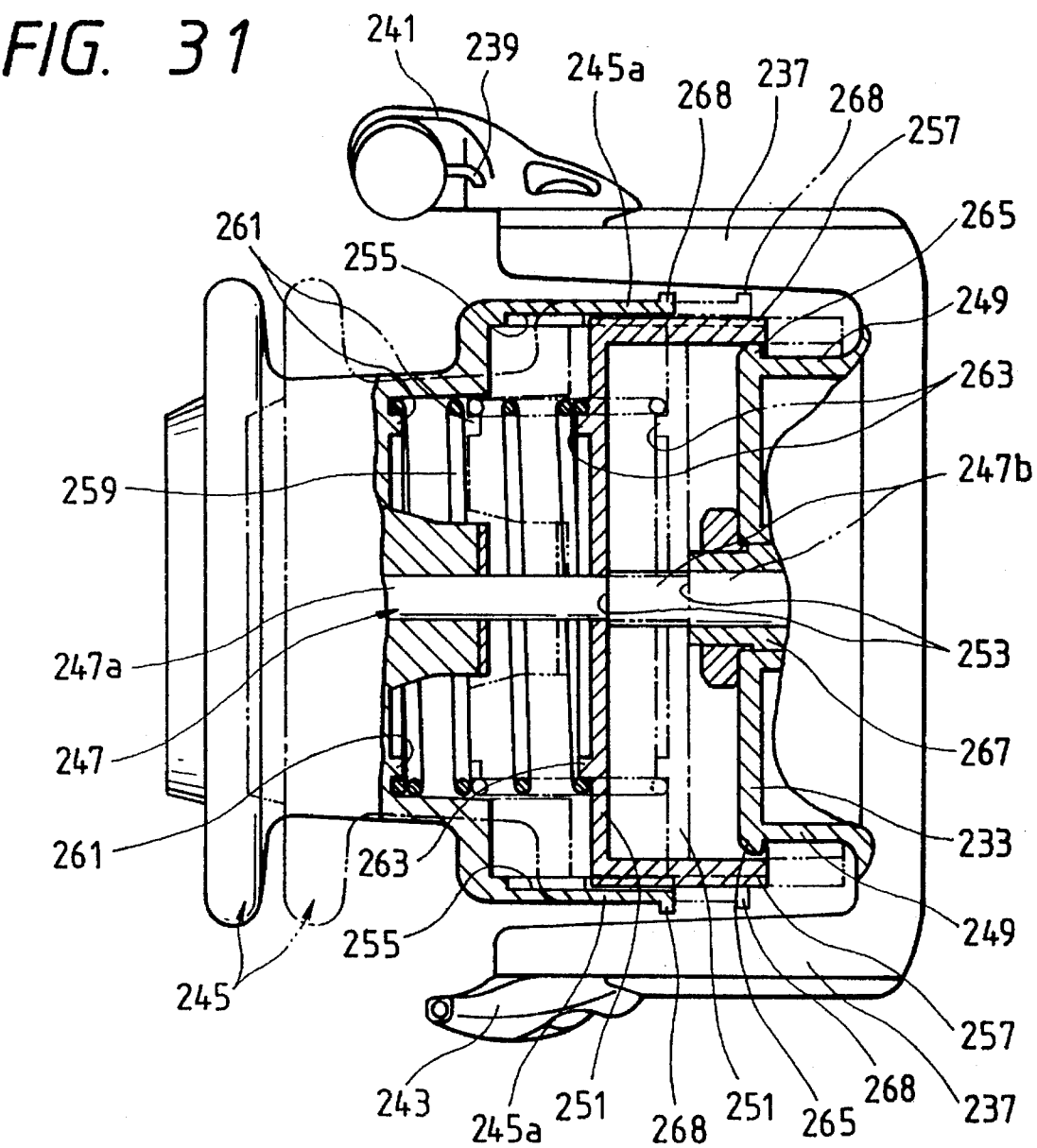
FIG. 31 is a cutaway elevational view of the principal part of a modification of the spinning reel for fishing shown in FIG. 28.

In addition to the arrangement above, there may be provided, as shown in FIG. 31, a plurality of retaining projections 268 on the rear end, outer periphery of the skirt portion 245a in such a way that the retaining projections 268 are formed integrally or separately at appropriate angular intervals in the circumferential direction, or otherwise annularly over the whole outer periphery thereof.

With such an arrangement, the effect that can be anticipated thereby is superior to what is achievable in the embodiment of FIG. 28 since the provision of the retaining projections 268 makes it possible to prevent the fishing line from moving toward and beyond the rear end of the spool 245.

Figure 32:
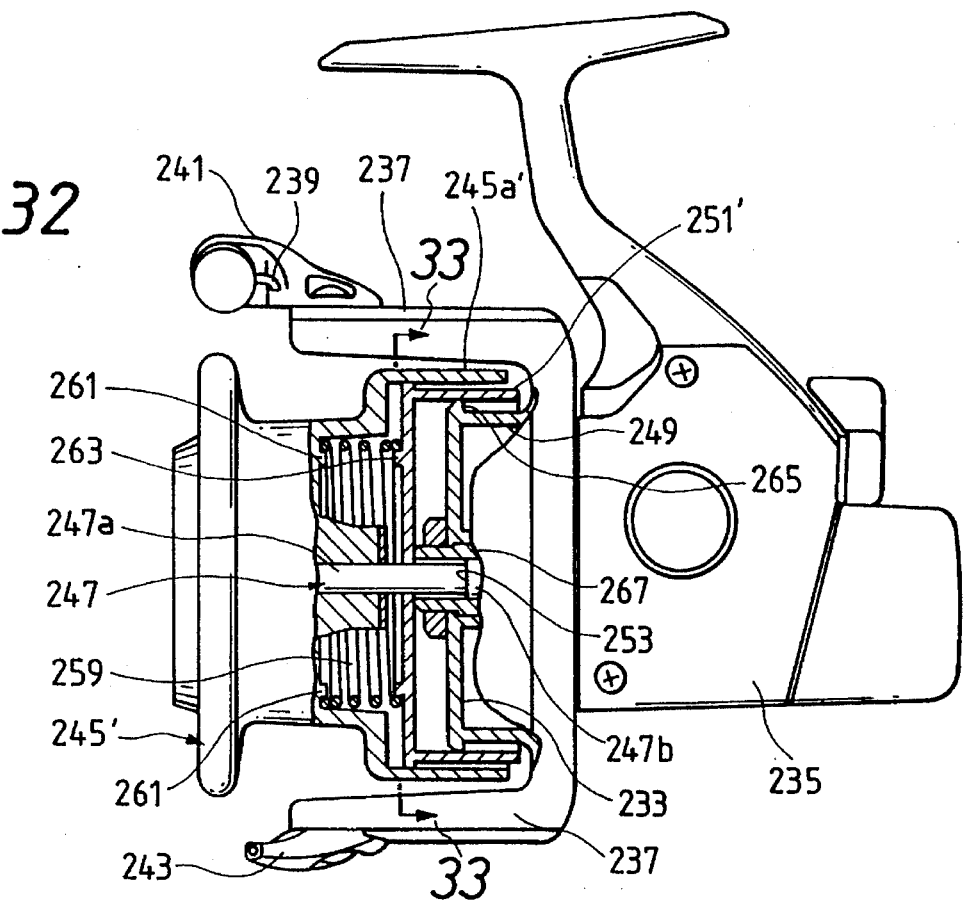
FIG. 32 is a partial cutaway elevational view of a thirteenth embodiment of the spinning reel for fishing according to the present invention.
Figure 33:
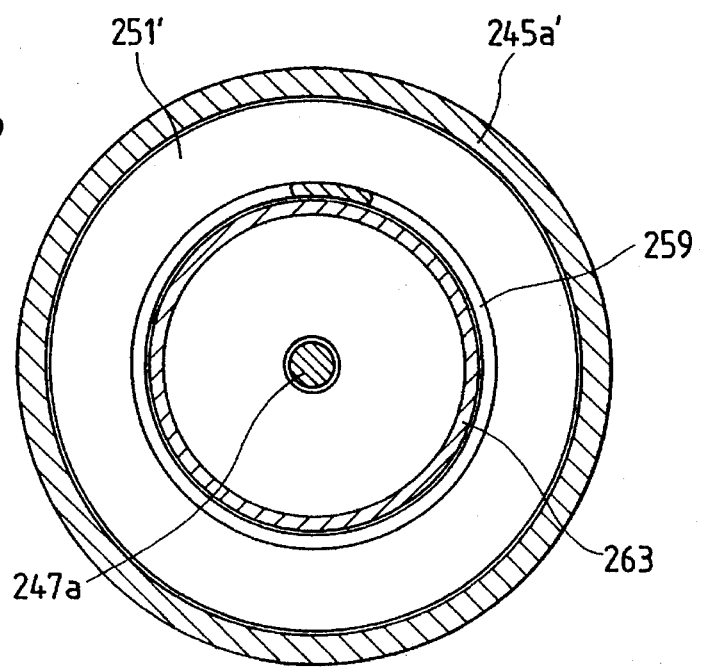
FIG. 33 is a sectional view taken along line 33—33 of FIG. 32.

FIGS. 32 and 33 show a thirteenth embodiment of the spinning reel for fishing according to the present invention. In the twelfth embodiment shown in FIG. 28, the guide grooves 255 with which the mating portions 257 of the retainer 251 engage are provided in the skirt portion 245a of the spool 245. Functionally, the restrainer 251 need not be guided along the guide grooves 255, however.

Instead of providing the guide grooves and the mating portions on the inner periphery of the skirt portion 245a' of a spool 245' and the outer periphery of a restrainer 251', the skirt portion 245a' and the restrainer 251' are set in non-engagement with each other in this embodiment as shown in FIGS. 32 and 33. In this case, the restrainer 251' is movably fitted to the spool shaft 247. As the remaining arrangement is similar to what is referred to in the twelfth embodiment, like reference characters are given to like component parts and the description thereof will be omitted.

Therefore, the fishing line is also prevented from being caught by the spool shaft 247 without causing any trouble to the operation of winding or releasing the fishing line in this embodiment. Moreover, there is no possibility that the weight of the whole reel may increase even when the stroke of a spinning reel is lengthened. The noise deriving from the backlash of the restrainer 251' can be obviated during the fishing operation.

Figure 34:
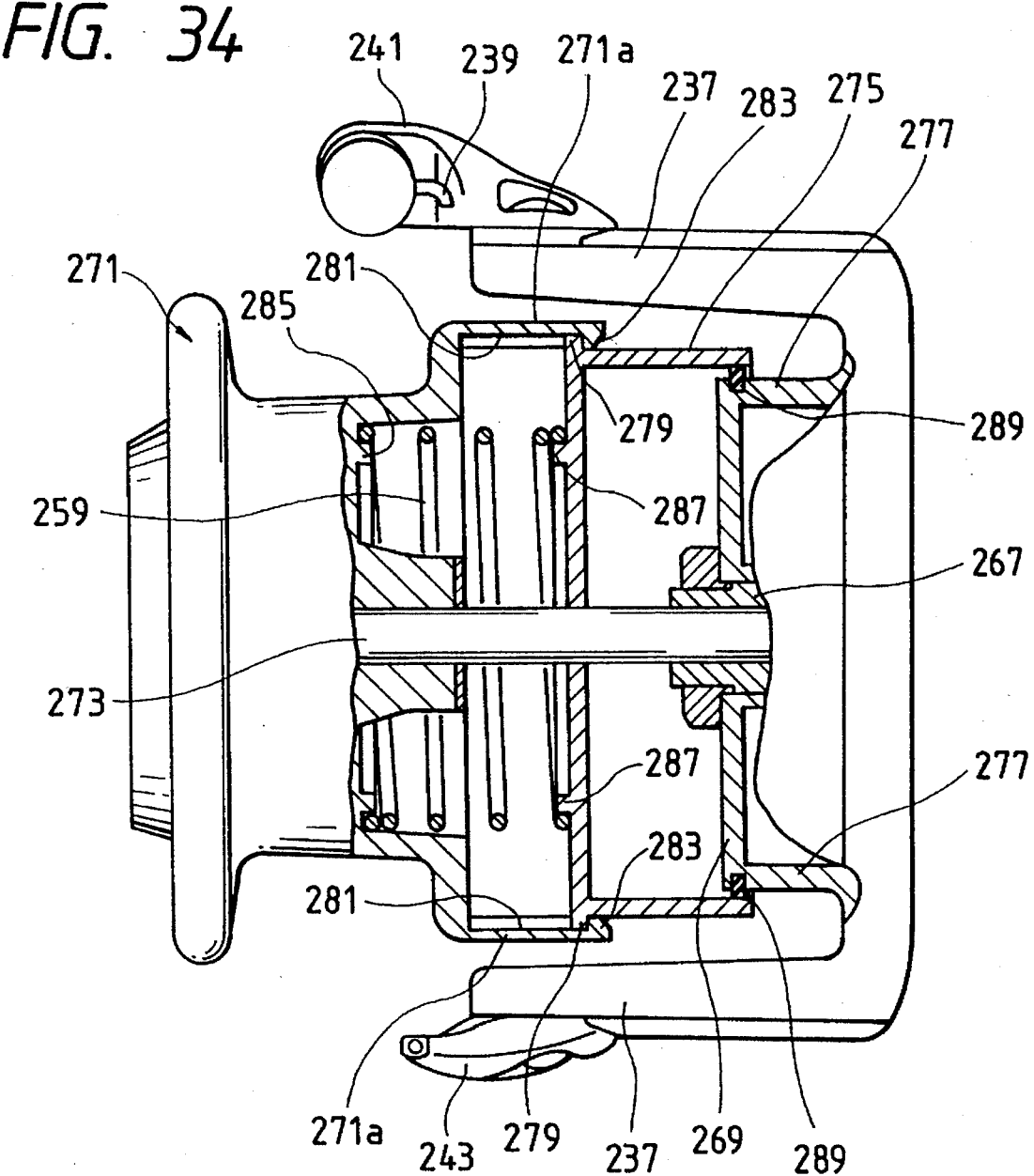
FIG. 34 is a cutaway elevational view of the principal part of a fourteenth embodiment of the spinning reel for fishing according to the present invention.

FIG. 34 shows a fourteenth embodiment of the spinning reel for fishing according to the present invention, wherein retaining members for moving the restrainer, in place of the retaining portion 53 in the twelfth embodiment are provided on the spool.

Referring to FIG. 34, this embodiment will subsequently be described, wherein like reference characters designate like component parts in the preceding embodiments and the description thereof will be omitted.

In FIG. 34, reference numeral 269 denotes a rotor rotatably fitted to the forward end of a reel body; and 271, a spool provided concentrically with the rotor 269 via a spool shaft 273. As in the twelfth embodiment, a fishing line is wound on the spool 271 as the rotor 273 is rotated by turning the manually operated handle.

In FIG. 34, further, reference numeral 275 denotes a restrainer formed into a profile substantially similar to that of the restrainer 251. This restrainer 275 is also placed between the skirt portion 271a of the spool 271 and the cylindrical portion 277 of the rotor 269, and its rear end is extended up to the base of the bail support arms 237.

The inner periphery of the skirt portion 271a of the spool 271 is provided with guide grooves 281 extending along the spool shaft 273, and mating portions 79 projected from the leading-end outer periphery of the restrainer 275 and arranged at the angular interval of 180° movably engage with the respective guide grooves 281. Moreover, retaining portions 83 for retaining the respective mating portions 279 to mow the restrainer 275 forward when the spool 271 is moved forward by turning the manually operated handle are inwardly projected from the forward end of the skirt portion 271a.

Annular spring holding portions 285 and 287 centering around the spool shaft 273 are, as in the twelfth embodiment, formed on the forward-end inner face of the spool 271 and the forward-end surface of the restrainer 275 located opposite to the former, respectively. Moreover, the coil spring 259 which keeps urging the restrainer 251 backward is stretched between the coil spring holding portions 285 and 87.

In FIG. 34, further, reference numeral 289 denotes an annular rubber ring fitted to the outer periphery of the cylindrical portion 277 of the rotor 269. At this time, the rubber ring 289 is depressingly in contact with the inner periphery of the restrainer 275 so as to prevent, like the retaining projections 265, the fishing line from entering the inside of the spool 271 or the inside of the restrainer 275 and being caught by the spool shaft 273.

With the arrangement in this embodiment, the spool 271 makes the reciprocating motion as the fishing line is wound thereon, and when the spool 71 is moved forward as shown in FIG. 34, the retaining portions 283 on the side of the spool 271 engage with the respective mating portions 279 of the restrainer 275 to move the restrainer 275 in the same direction. As the spool 271 is moved back then, the restrainer 275 is pushed back to the original position because the coil spring 259 urges the restrainer 275 toward the rotor 269.

Even when the fishing line tries to enter the gap between the spool 271 and the rotor 269 due to tensional fluctuation and the twisting of the fishing line, the restrainer 275 extends across the gap between the cylindrical portion 277 of the rotor 269 and the inner periphery of the skirt portion 271a of the spool 271 so as to prevent the fishing line from being caught by the spool shaft 273. The annular rubber ring 289 on the outer periphery of the rotor 269 also prevents the fishing line from being caught by the spool shaft 273 likewise. When the restrainer 275 is moved back and forth, the coil spring 259 forces the restrainer 275 to contact the retaining members 283 and the collar shaft 267 to prevent the backlash or clattering of the restrainer 275.

Since the restrainer 275 is fitted to the inner face of the spool 271, the fishing line is also prevented from entering the gap between the spool 271 and the rotor 269 and being caught by the spool shaft 273 without causing any trouble to the movements of the spool 271 and the rotor 269 in this embodiment like the twelfth embodiment shown in FIG. 28. Moreover, there is no possibility that the weight of the whole reel may increase even when the stroke of a spinning reel is lengthened and besides noise deriving from the backlash of the restrainer 275 can be obviated during the fishing operation.

Figure 35:
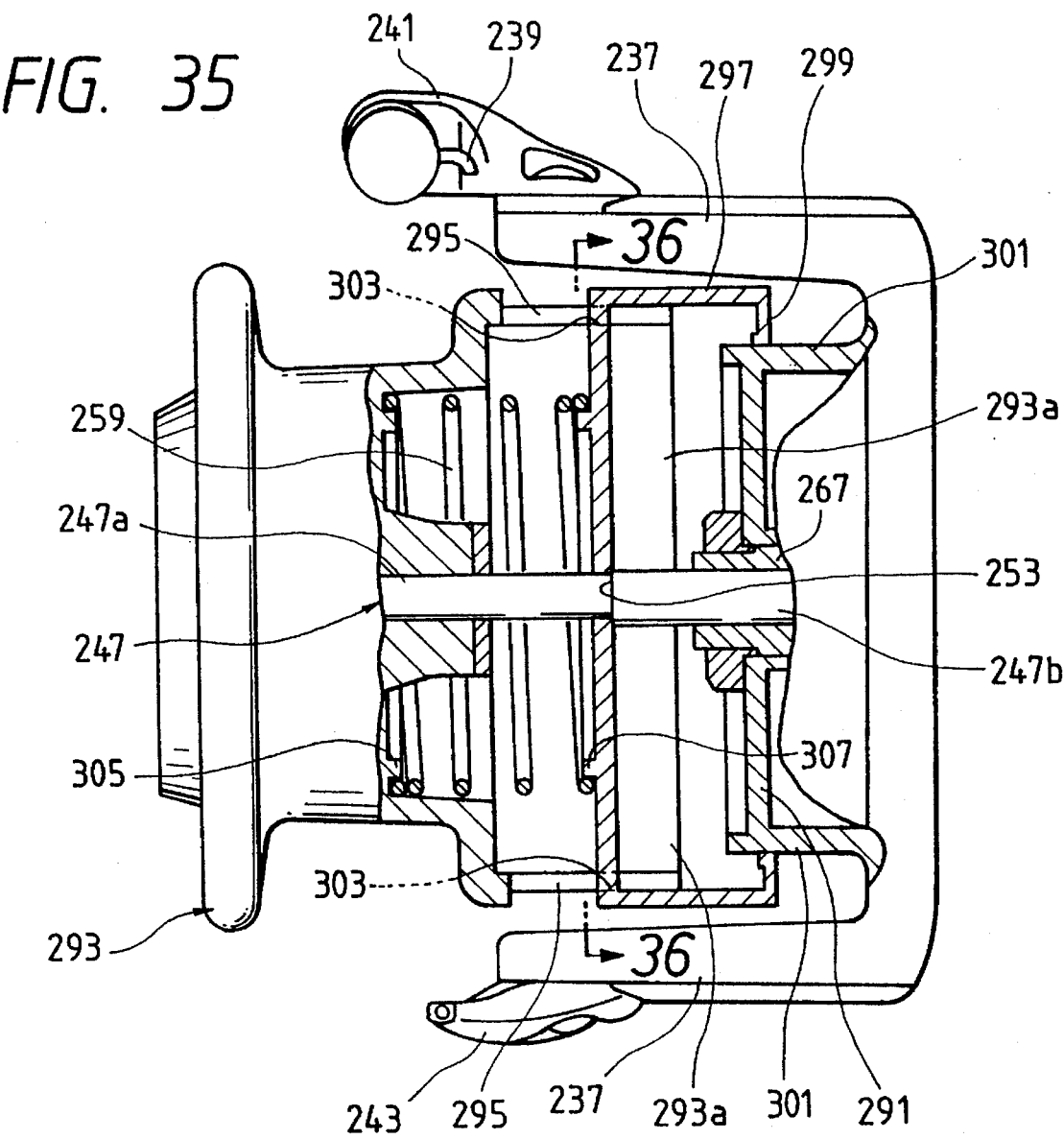
FIG. 35 is a cutaway elevational view of the principal part of a fifteenth embodiment of the spinning reel for fishing according to the present invention.
Figure 36:
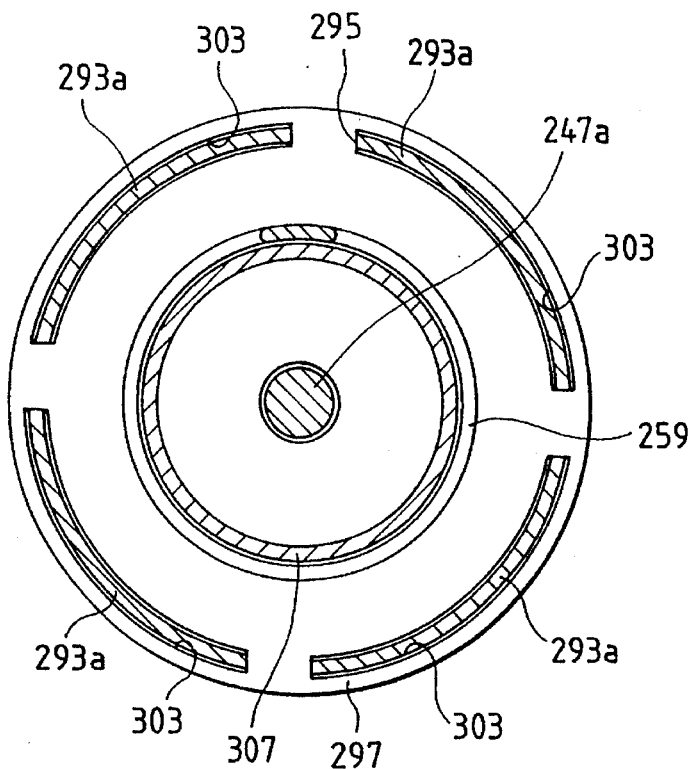
FIG. 36 is a sectional view taken along line 36—36 of FIG. 35.

FIGS. 35 and 36 show a fifteenth embodiment of the spinning reel for fishing according to the present invention, wherein reference numeral 291 denotes a rotor; and 293, a spool concentrically arranged with respect to the rotor 291. The spool 293 is supported with the spool shaft 247 and when the rotor 291 is rotated by turning the manually operated handle, the fishing line is wound onto the spool 293 making the reciprocating motion linking with the rotation of the rotor 291.

The skirt portion of the spool 293 in this embodiment comprises four tongue-like skirt pieces 293a which are arcuate in cross section as shown in FIG. 36, these skirt pieces 293a forming the substantially cylindrical shape like the skirt portion 245a in the twelfth embodiment. Gaps 295 are provided for the respective adjacent pair of tongue-like skirt pieces, the gaps being arranged substantially at the angular interval of 90°.

In FIG. 35, moreover, reference numeral 297 denotes a closed-end plastic cylindrical restrainer having a flange portion 299 for preventing the fishing line from being caught by the spool shaft 247. The flange portion 299 is formed at the rear end of the restrainer 97 and extended radially inwardly toward in the cylindrical portion 301 of the rotor 291. Further, the restrainer 297 is formed with four arcuate recesses 303 into which the respective tongue-like skirt pieces 293a are fitted as shown in FIG. 36.

Then the spool shaft 247 is passed through the center of the restrainer 297 so that the restrainer 297 is movably fitted thereto. When the spool 293 is moved forward, the retaining portion 253 makes the restrainer 297 follow in the same direction. When the spool 293 is moved to the forward end as shown in FIG. 35, the restrainer 297 extends across the gap between the cylindrical portion 301 of the rotor 291 and the respective tongue-like skirt 293a of the spool 293 to prevent the fishing line from being caught by the spool shaft 247.

In this embodiment of the spinning reel for fishing like the preceding ones, the coil spring 259 is stretched via spring holding portions 305 and 307 on the forward-end inner face of the spool 293 and the forward-end surface of the restrainer 297 located opposite to the former. The coil spring 259 thus prevents the restrainer 297 from clattering.

The spinning reel for fishing in this embodiment is thus constructed. When the spool 293 is moved forward while winding the fishing line thereon, the retaining portion 253 engages with the restrainer 297 and makes the restrainer 297 move in the same direction. As the spool 293 is moved back, the restrainer 297 is then pushed back to the original position because the coil spring 59 urges the restrainer 297 toward the rotor 291. The longitudinal movement of the restrainer 297 in this case is guided through the respective gaps 295 provided in between the tongue-like skirt pieces 293a.

Even when the fishing line tries to enter the gap between the spool 293 and the rotor 291 due to tensional fluctuation and the twisting of the fishing line, the restrainer 275 extends across the gap between the cylindrical portion 301 of the rotor 291 and the respective tongue-like skirt pieces 293a so as to prevent the fishing line from being caught by the spool shaft 247. The flange member 299 also prevents the fishing line from being caught by the spool shaft 273 likewise. When the restrainer 297 is moved back and forth, the coil spring 259 forces the restrainer 297 to contact the retaining portion 253 and the collar shaft 267 to prevent clattering of the restrainer 297.

It is therefore possible to prevent the undesirable line catch without causing any trouble to the movements of the spool 293 and the rotor 291 in this embodiment like the preceding ones. Moreover, the increase of the weight of the whole reel can be reduced even when the stroke of a spinning reel is lengthened, and the noise generated by the clattering of the restrainer 97 can be obviated during the fishing operation.

Figure 37:
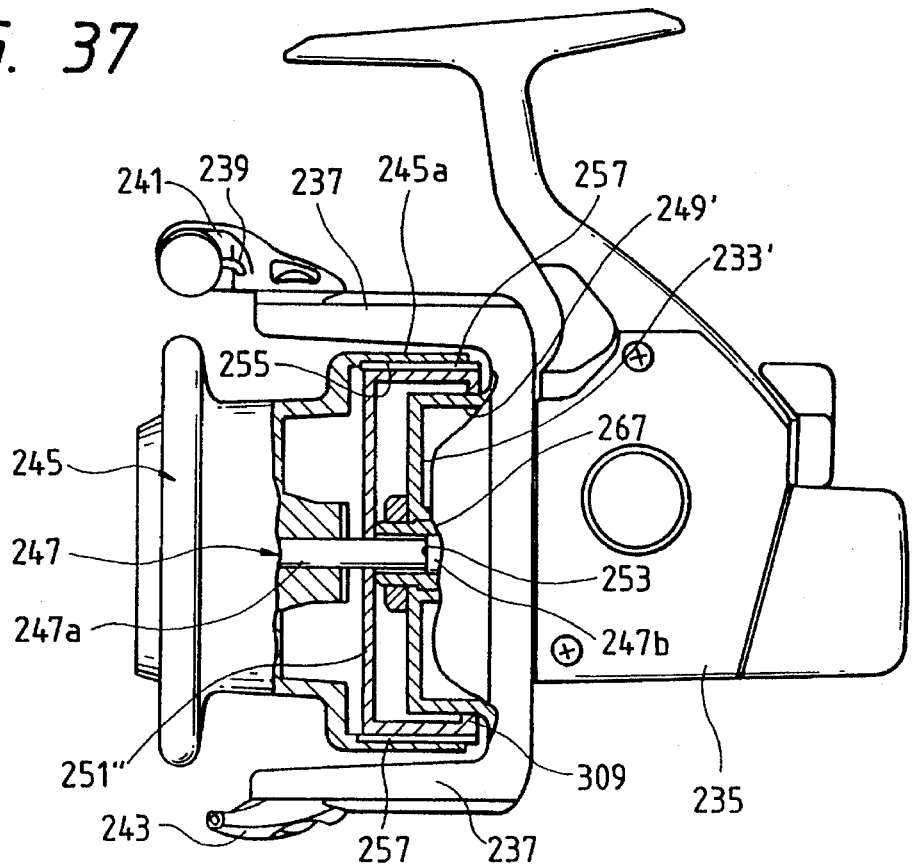
FIG. 37 is a partial cutaway elevational view of a sixteenth embodiment of the spinning reel for fishing according to the present invention.

FIG. 37 shows a sixteenth embodiment of the spinning reel for fishing according to the present invention, wherein the coil spring 259 in the embodiment of FIG. 28 is omitted and, in place of the retaining projections 265 provided on the rotor 233, retaining projections 309 projected toward the cylindrical portion 249' of a rotor 233' are provided at the rear end of a restrainer 251" so as to prevent the entry of the fishing line toward the spool shaft 247. As the remaining arrangement is similar to what is referred to in the twelfth embodiment, like reference characters are given to like component parts and the description thereof will be omitted.

Like the spinning reel for fishing in FIG. 28, it is also possible to prevent the fishing line from being caught by the spool shaft 247 without causing any trouble to the operation of winding or releasing the fishing line in this embodiment. Moreover, there is no possibility that the weight of the whole reel may increase even when the stroke of a spinning reel is lengthened.

Although this embodiment refers to the omission of the coil spring for positively preventing the backlash or clattering of the restrainer 251", the backlash of the restrainer 251" can be obviated to a certain extent by forming an oil film on the surface of the spool shaft 247 passed through the restrainer 251".

As set forth above, the present invention ensures that the fishing line is prevented from entering the inside of the spool without interference with the movements of the spool and the rotor in contrast with the prior art. Even when the stroke of the spinning reel is lengthened, moreover, there is little fear for the whole reel to become heavier.

In the case of spinning reels for fishing in which a coiled spring is provided, the noise generated due to clattering of the restrainer during the fishing operation can be positively prevented.

What is claimed is:

1. A spinning reel for fishing, comprising a rotor rotatably mounted on a reel body, and a spool supported to the reel body through a spool shaft such that the spool is capable of reciprocating in an axial direction of the spool shaft and that a fishing line is wound on the spool when the rotor is rotated by a manually operated handle, characterized by further comprising:

a fishing-line entry restrainer for preventing the fishing line from being wound on the spool shaft, the fishing-line entry restrainer being movably mounted on a radially outwardly facing cylindrical surface of the rotor, which cylindrical surface is adapted to be located within the spool; and follow-up means for causing the fishing-line entry restrainer to move forward when the spool is moved forward.

2. A spinning reel for fishing as claimed in claim 1, wherein the follow-up means includes a retaining portion provided on one of the spool and the spool shaft and engageable with the fishing-line entry restrainer to move the fishing-line entry restrainer forward.

3. A spinning reel for fishing as claimed in claim 1, wherein the follow-up means includes a spring member held between the rotor and the fishing-line entry restrainer for urging the fishing-line entry restrainer forward.

4. A spinning reel for fishing, comprising a rotor rotatably mounted on a reel body, and a spool supported on the reel body via a spool shaft such that the spool is capable of reciprocating in an axial direction of the spool shaft and that a fishing line is wound on the spool when the rotor is rotated by a manually operated handle, characterized by further comprising:

a fishing-line entry restrainer mounted on a cylindrical portion of the rotor, which cylindrical portion is adapted to be located within the spool, the fishing-line entry restrainer including:

a restrainer base fixed stationarily to the cylindrical portion of the rotor; and a movable restrainer member provided on the restrainer base and movable in the axial direction with respect to the restrainer base; and follow-up means for causing the movable restrainer member to move forward when the spool is moved forward.

5. A spinning reel for fishing as claimed in claim 4, wherein the follow-up means includes a retaining portion provided on one of the spool and the spool shaft and engageable with the movable restrainer member to move the fishing-line entry restrainer forward.

6. A spinning reel for fishing as claimed in claim 4, wherein the follow-up means includes a spring member held between the rotor and the movable restrainer member for urging the movable restrainer member forward.

7. A spinning reel for fishing, comprising a rotor rotatably mounted on a reel body, and a spool supported to the reel body via a spool shaft such that the spool is capable of reciprocating in an axial direction of the spool shaft and that a fishing line is wound thereon when the rotor is rotated by a manually operated handle, characterized by further comprising:

a fishing-line entry restrainer for preventing the fishing line from being wound on the spool shaft, the fishing-line entry restrainer being movably mounted on an inner face of the spool; and follow-up means for causing the fishing-line entry restrainer to move forward when the spool is moved forward.

8. A spinning reel for fishing as claimed in claim 7, wherein the follow-up means includes a retaining portion provided on one of the spool and the spool shaft and engageable with the fishing-line entry restrainer to move the fishing-line entry restrainer forward.

9. A spinning reel for fishing as claimed in claim 7, characterized by further comprising:

a spring member held between the spool and the fishing-line entry restrainer for urging the fishing-line entry restrainer backward in the axial direction.

10. A spinning reel for fishing comprising:

a rotor rotatably mounted on a reel body;

a spool supported on the reel body via a spool shaft such that a fishing line is capable of being wound onto the spool and the spool makes a reciprocating motion in an axial direction of the spool shaft when the rotor is rotated by a manually operated handle, said spool reciprocating between an retracted position and an extended position;

a fishing-line entry restrainer for preventing the fishing line from being wound on the spool shaft, the fishing-line entry restrainer extending along an axial gap created between the spool and the rotor when the rotor reciprocates toward said extended position; and follow-up means for causing the fishing-line entry restrainer to move forward when the spool is moved forward.

11. A spinning reel for fishing as claimed in claim 10, wherein the fishing-line entry restrainer is movably fitted on at least one of the spool and the rotor.

12. A spinning reel for fishing as claimed in claim 10, wherein the fishing-line entry restrainer is movably fitted on the spool shaft.

13. A spinning reel for fishing as claimed in claim 10, wherein the fishing-line entry restrainer includes a restrainer base fixed stationary to the rotor and a movable restrainer member supported on restrainer base and movable in the axial direction.

14. A spinning reel for fishing as claimed in claim 10, wherein the follow-up means includes a retaining portion formed on one of the spool and the spool shaft and engageable with the fishing-line entry restrainer when the spool is moved forward.

15. A spinning reel for fishing as claimed in claim 14, further comprising:

a spring member interposed between the spool and the fishing-line entry restrainer for urging the fishing-line entry restrainer backward.

16. A spinning reel for fishing as claimed in claim 10, wherein the follow-up means includes a spring member interposed between the rotor and the fishing-line entry restrainer for urging the fishing-line entry restrainer forward.

17. A spinning reel for fishing as claimed in claim 10, further comprising:

a spring member interposed between the spool and the restrainer for urging the fishing-line entry restrainer backward.

18. A spinning reel for fishing comprising:

a rotor rotatably mounted on a reel body, said rotor being formed with support arms and a cylindrical portion disposed radially within said support arms;

a bail pivotally mounted on said support arms;

a spool supported on the reel body via a spool shaft such that the spool is capable of reciprocating in an axial direction of the spool shaft from a retracted position to an extended position, wherein a fishing line is wound on the spool when the rotor is rotated by a manually operated handle;

a fishing-line entry restrainer for preventing the fishing line from being wound onto the spool shaft, the fishing-line entry restrainer being provided with at least one mating portion which slidingly mates with a respective guide groove located on one of said rotor and said spool;

follow-up means for causing the fishing-line entry restrainer to move forward when the spool is moved forward.

19. A spinning reel for fishing as claimed in claim 18, wherein said guide groove is disposed on a radially outwardly facing cylindrical surface of the rotor.

20. A spinning reel for fishing as claimed in claim 18, wherein said guide groove is formed as a slot in said cylindrical portion of said rotor.

21. A spinning reel for fishing as claimed in claim 18, wherein said guide groove is disposed on a radially inwardly facing surface of said spool.

22. A spinning reel for fishing as claimed in claim 18, wherein said guide groove is formed as a slot on said spool.

* * * * *